US011825066B2

(12) United States Patent
Araki et al.

(10) Patent No.: US 11,825,066 B2
(45) Date of Patent: Nov. 21, 2023

(54) VIDEO REPRODUCTION APPARATUS, REPRODUCTION METHOD, AND PROGRAM

(71) Applicant: SONY CORPORATION, Tokyo (JP)

(72) Inventors: Yuichi Araki, Tokyo (JP); Yuichi Hasegawa, Tokyo (JP); Nobuaki Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 150 days.

(21) Appl. No.: 17/292,156

(22) PCT Filed: Dec. 12, 2019

(86) PCT No.: PCT/JP2019/048705
§ 371 (c)(1),
(2) Date: May 7, 2021

(87) PCT Pub. No.: WO2020/137584
PCT Pub. Date: Jul. 2, 2020

(65) Prior Publication Data
US 2022/0060672 A1 Feb. 24, 2022

(30) Foreign Application Priority Data

Dec. 25, 2018 (JP) .................................. 2018-240681

(51) Int. Cl.
*H04N 13/189* (2018.01)
*H04N 13/178* (2018.01)
(Continued)

(52) U.S. Cl.
CPC ......... *H04N 13/189* (2018.05); *H04N 13/178* (2018.05); *H04N 13/282* (2018.05); *H04N 13/366* (2018.05)

(58) Field of Classification Search
CPC .. H04N 13/189; H04N 13/178; H04N 13/282; H04N 13/366; H04N 13/194;
(Continued)

(56) References Cited

U.S. PATENT DOCUMENTS 5,714,997 A 2/1998 Anderson
2014/0055348 A1* 2/2014 Sudo .................... H04N 13/376
345/156
(Continued)

FOREIGN PATENT DOCUMENTS

CN 101742349 A 6/2010
CN 104012106 A 8/2014
(Continued)

*Primary Examiner* — Tung T Vo
(74) *Attorney, Agent, or Firm* — Paratus Law Group, PLLC

(57) ABSTRACT

There is provided a video reproduction apparatus, a reproduction method, and a program that can suppress a decline in the degree of immersion of a viewer. A video generation apparatus of the present disclosure acquires a first 3D shape video generated from a plurality of viewpoint videos obtained by capturing images of a subject from different viewpoints, and a second 3D shape video being a video different from the first 3D shape video, and switches a frame to be reproduced, from a frame of the first 3D shape video to a frame of the second 3D shape video on the basis of a state of a viewer viewing the first 3D shape video. The present disclosure may be applied, for example, to a video generation apparatus, a video processing apparatus, a video reproduction apparatus, or the like.

19 Claims, 26 Drawing Sheets

(51) Int. Cl.
*H04N 13/282* (2018.01)
*H04N 13/366* (2018.01)

(58) Field of Classification Search
CPC .. H04N 13/279; H04N 13/344; H04N 13/117; H04N 21/21805; H04N 21/234345; H04N 21/8545; H04N 2013/0081; H04N 13/243; H04N 21/4728; H04N 5/66; H04N 13/158; H04N 21/438; H04N 21/816
USPC .......................................................... 348/46
See application file for complete search history.

(56) References Cited

U.S. PATENT DOCUMENTS

2021/0092466 A1* 3/2021 Suzuki .................... A63F 13/25
2021/0160473 A1* 5/2021 Uemura ............... H04N 13/111

FOREIGN PATENT DOCUMENTS

| CN | 105912102 A | 8/2016 |
| CN | 107888939 A | 4/2018 |
| CN | 108882018 A | 11/2018 |
| JP | H11-018058 A | 1/1999 |
| JP | 2017-055851 A | 3/2017 |
| JP | 2017-069787 A | 4/2017 |
| JP | 2017-135464 A | 8/2017 |
| WO | WO 2017/082076 A1 | 5/2017 |
| WO | WO 2017/204172 A1 | 11/2017 |
| WO | WO 2018/030206 A1 | 2/2018 |
| WO | WO 2018/199052 A1 | 11/2018 |

* cited by examiner

VIDEO REPRODUCTION APPARATUS, REPRODUCTION METHOD, AND PROGRAM

CROSS REFERENCE TO PRIOR APPLICATION

This application is a National Stage Patent Application of PCT International Patent Application No. PCT/JP2019/048705 (filed on Dec. 12, 2019) under 35 U.S.C. § 371, which claims priority to Japanese Patent Application No. 2018-240681 (filed on Dec. 25, 2018), which are all hereby incorporated by reference in their entirety.

TECHNICAL FIELD

The present technology relates to a video reproduction apparatus, a reproduction method, and a program, and particularly relates to a video reproduction apparatus, a reproduction method, and a program for a video including a 3D object.

BACKGROUND ART

There has been conventionally considered a method of generating a 3D object within a viewing space using information regarding a sensed real 3D space, such as a multi-viewpoint video obtained by capturing images of a subject from different viewpoints, for example, and generating a video (will also be referred to as Volumetric Video) appearing as if the 3D object existed within the viewing space (for example, Patent Document 1).

CITATION LIST

Patent Document

Patent Document 1: WO 2017/082076 A

SUMMARY OF THE INVENTION

Problems to be Solved by the Invention

Because a video generated by the above-described method is a 3D shape video generated using an actual video of a subject, a viewer can experience an immersive feeling as if the subject existed closer to the viewer.

Nevertheless, even if a viewer performs an operation of touching or getting closer to a 3D object of a subject within a viewing space, the 3D object of the subject merely indicates a predefined motion irrespective of the motion of the viewer, and cannot indicate a reaction corresponding to the operation of the viewer, that is to say, cannot indicate an interactive reaction. Thus, there has been concern that the degree of immersion of the viewer is impaired.

The present disclosure has been devised in view of such a situation, and suppresses a decline in the degree of immersion of a viewer.

Solutions to Problems

A video reproduction apparatus according to an aspect of the present technology is a video reproduction apparatus including an acquisition unit configured to acquire a first 3D shape video generated from a plurality of viewpoint videos obtained by capturing images of a subject from different viewpoints, and a second 3D shape video being a video different from the first 30 shape video, and a switching processing unite, configured to switch a frame to be reproduced, from a frame of the first 3D shape video to a frame of the second 3D shape video on the basis of a state of a viewer viewing the first 3D shape video.

A reproduction method according to an aspect of the present technology is a reproduction method executed by a video reproduction apparatus, the reproduction method including acquiring a first 3D shape video generated from a plurality of viewpoint videos obtained by capturing images of a subject from different viewpoints, and a second 3D shape video being a video different from the first 3D shape video, and switching a frame to be reproduced, from a frame of the first 3D shape video to a frame of the second 3D shape video on the basis of a state of a viewer viewing the first 3D shape video.

MODE FOR CARRYING OUT THE INVENTION

Hereinafter, a mode for carrying out the present disclosure (hereinafter, referred to as an embodiment) will be described. Note that the description will be given in the following order.

0. Presupposition of Present Disclosure (FIGS. 1 and 2)
1. First Embodiment (FIGS. 3 to 10)
2. Second Embodiment (FIGS. 11 to 19)
3. Third Embodiment (FIGS. 20 to 25)

<Presupposition of Present Disclosure>

(Overview of Processing Starting from Image Capturing to Viewing of 3D Shape Video)

Figure 1:
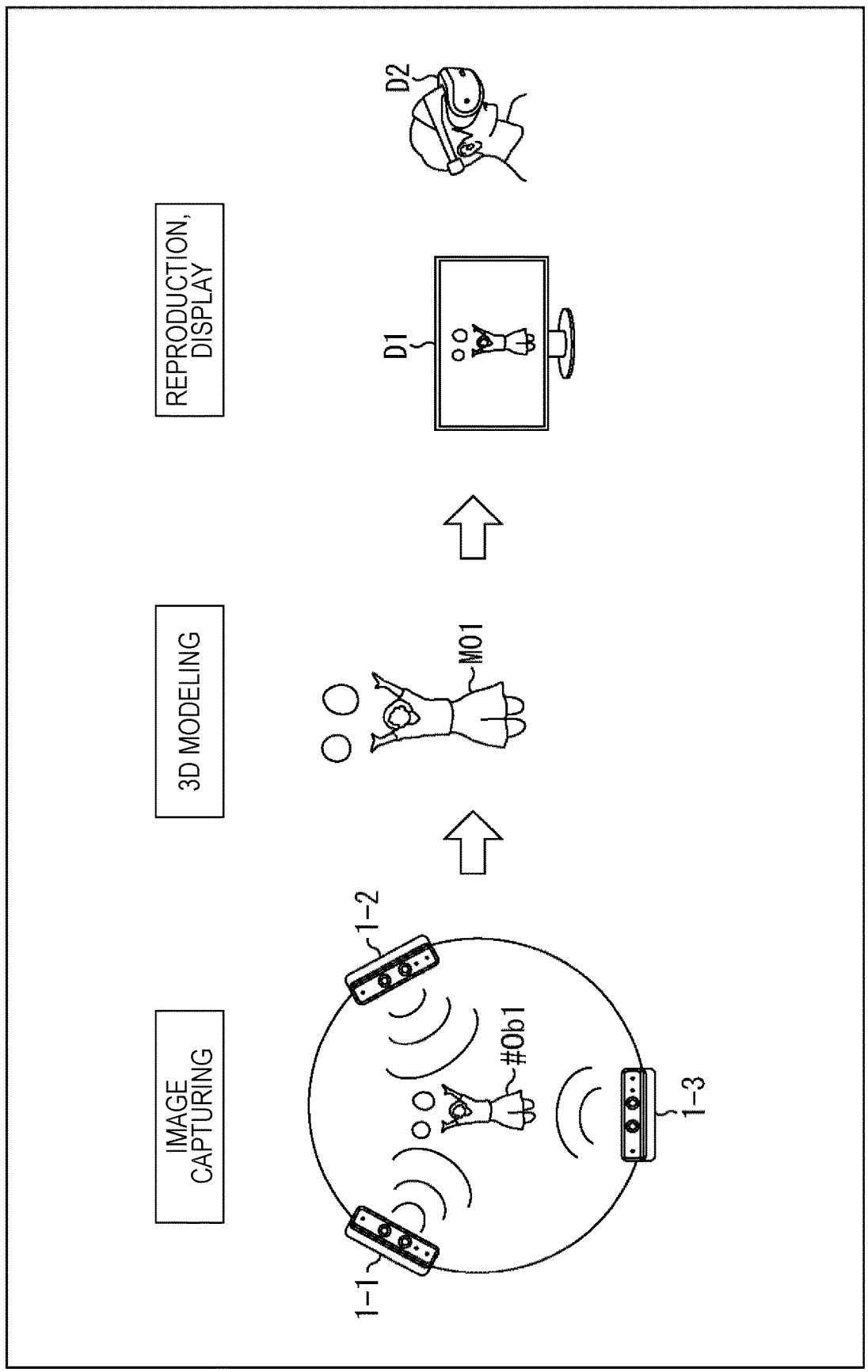
FIG. 1 is a diagram describing an overview of processing starting from image capturing to viewing of a 3D shape video according to the present disclosure.

FIG. 1 is a diagram illustrating an overview of processing starting from image capturing to viewing of a 3D shape video.

As illustrated in FIG. 1, the generation of a 3D shape video includes image capturing performed by a plurality of imaging apparatuses 1-1 to 1-3, and processing of generating a 3D object M01 by 3D modeling.

Specifically, as illustrated in FIG. 1, the plurality of imaging apparatuses 1-1 to 1-3 is arranged on the outside of a subject #Ob1 so as to surround the subject #Ob1. FIG. 1 illustrates an example in which the number of imaging apparatuses is three, and the imaging apparatuses 1-1 to 1-3 are arranged around the subject #Ob1. In the example illustrated in FIG. 1, a person who performs a predetermined operation is regarded as the subject #Ob1.

3D modeling is performed using video frames synchronously captured by the three imaging apparatuses 1-1 to 1-3, and a 3D object of the subject #Ob1 is generated for each of the video frames captured by the three imaging apparatuses 1-1 to 1-3.

The format of a 3D object may be, for example, a format including mesh data representing geometry information of the subject #Ob1 by connection between vertices that is called a polygon mesh, and color information corresponding to each polygon mesh, or may be a point cloud format being an aggregate of points on a 3D space having shape information and attribute information (in particular, color information), for example.

Then, a 3D shape video is generated using a 3D object of a subject that represents a series of motions. The 3D shape video includes a temporal sequence of a plurality of frames including the 3D object of the subject that performs the series of motions. A video of a background that represents a predetermined space is appropriately combined with the 3D object.

Content data including data of the generated 3D shape video is transmitted to a reproduction side apparatus and reproduced. The data of the 3D shape video is reproduced, and the rendering of the 3D object of the subject is performed. The 3D shape video is thereby displayed on a viewing device of a viewer. In the example illustrated in FIG. 1, a display D1 and a head mount display (HMD) D2 are used as viewing devices.

(Example of 3D Shape Video)

Figure 2:
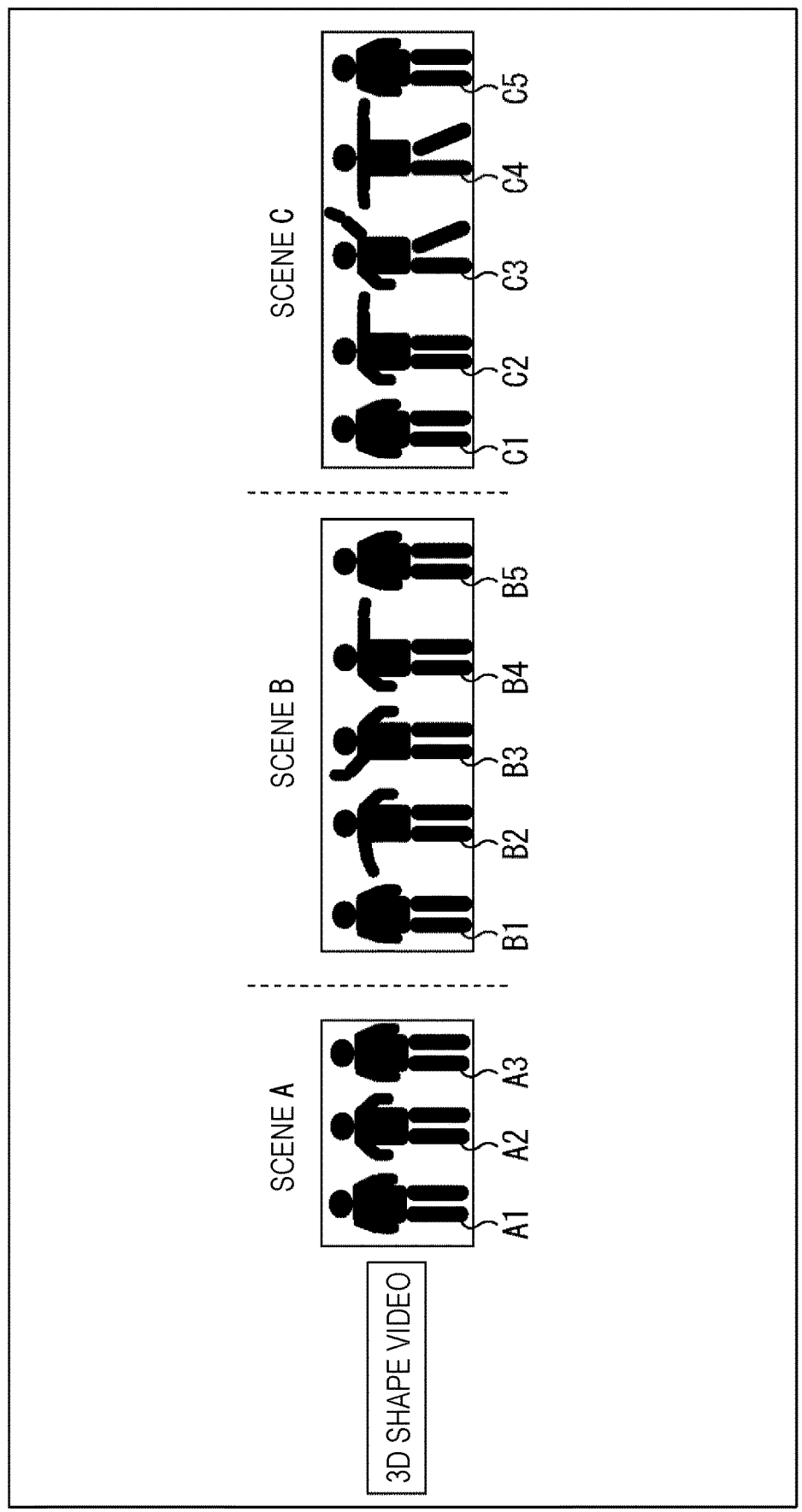
FIG. 2 is a diagram describing an example of a 3D shape video.

FIG. 2 is a diagram illustrating an example of a plurality of generated 3D shape videos (hereinafter, will also be referred to as scenes).

In a video generation apparatus, data of a plurality of scenes targeting a 3D object of the same subject is generated. In the example illustrate in FIG. 2, a scene A, a scene B, and a scene C are generated. The scene A, the scene B, and the scene C are three scenes respectively representing individual different motions.

In the example illustrated in FIG. 2, the scene A includes three frames corresponding to frames A1 to A3, the scene B includes five frames corresponding to frames B1 to B5, and the scene C includes five frames corresponding to frames C1 to C5.

Note that the illustration of one person indicated by a black solid shape corresponds to one frame included in a scene. The same applies to other drawings following FIG. 2. The respective different motions performed by the same subject are represented by the frames A1 to A3 included in the scene A, the frames B1 to B5 included in the scene B, and the frames C1 to C5 included in the scene C.

The data of scenes representing the respective different motions using 3D objects of a subject that has been generated in this manner is transmitted from a video generation apparatus to a video reproduction apparatus.

In the video reproduction apparatus, the reproduction of data of scenes is carried forward in such a manner that a reproduction target is switched at a predetermined timing. By the switching of a reproduction target, a scene to be viewed by a viewer is switched, and the motion of a 3D object included in a scene changes in accordance with the state of a viewer.

First Embodiment (Overview of Operation in First Embodiment)

Figure 3:
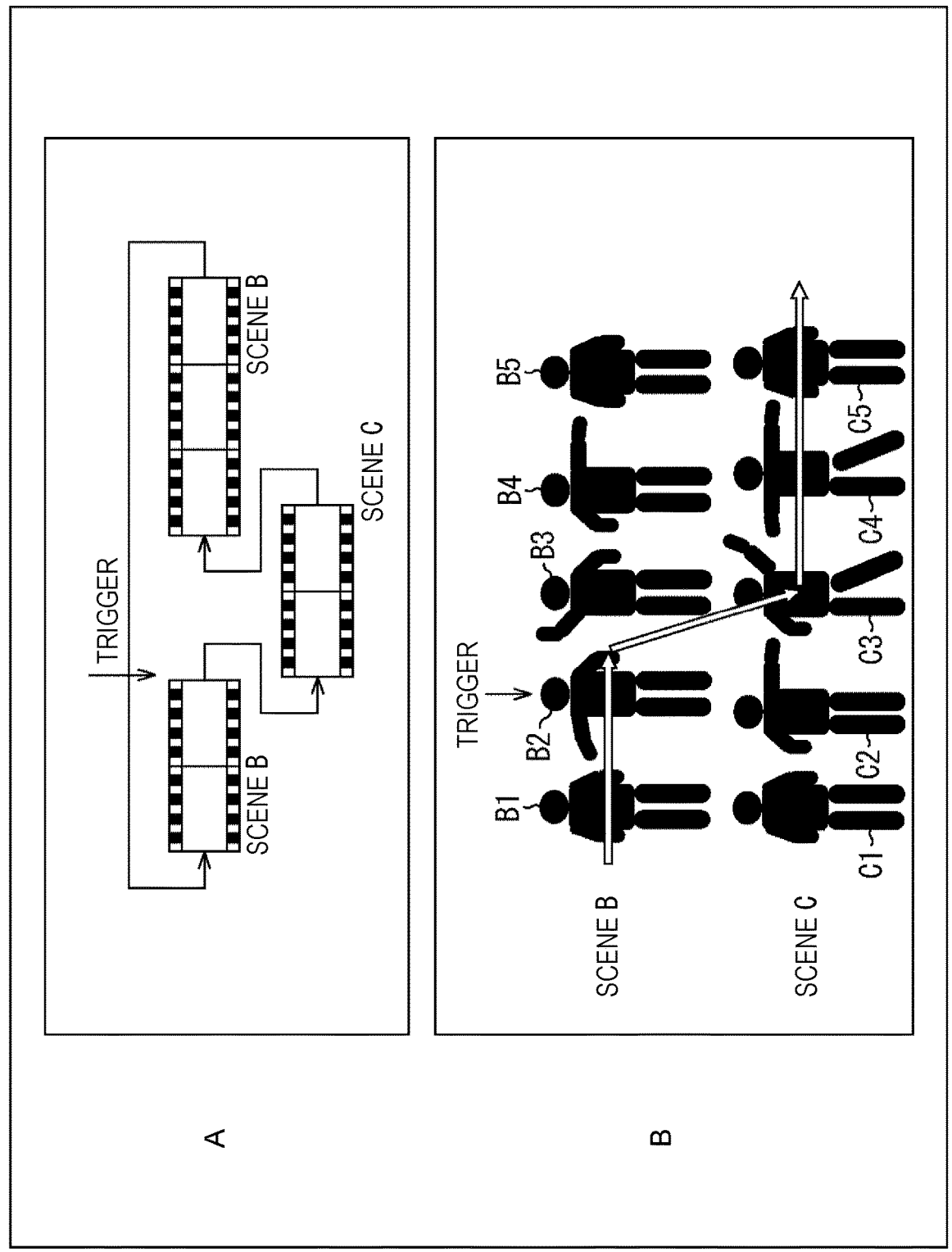
FIG. 3 is a diagram describing an overview of a switching operation example according to a first embodiment of the present disclosure.

FIG. 3 is a diagram describing an overview of an operation example of switching scenes according to a first embodiment of the present disclosure.

As illustrated in "A" of FIG. 3, for example, content includes two scenes corresponding to the scene B serving as a main scene, and the scene C serving as a sub scene.

If trigger information requesting the switching of a video is acquired in a certain frame of the scene B being reproduced by the video reproduction apparatus, the video reproduction apparatus switches a scene to be reproduced, to the scene C.

After switching a scene to be reproduced, to the scene C, the video reproduction apparatus performs the reproduction of the scene C. If the reproduction of the scene C ends, the video reproduction apparatus performs processing of switching a reproduction target to a predefined frame of the scene B, and subsequently, continues the reproduction of the scene B.

Switching processing from the scene B to the scene C will be specifically described.

As indicated by a down-pointing arrow in "B" of FIG. 3, it is assumed that trigger information requesting the switching to the scene C is acquired in the frame B2 of the scene B, for example. In this case, upon the trigger information being acquired, a reproduction target is switched to the frame C3 of the scene C.

For example, a switching destination scene and a switching destination frame are predefined. Whichever frame of the frames included in the scene C may be used as a switching destination, or a frame of another scene (not illustrated) may be used as a switching destination.

The above-described trigger information defining the switching of a scene serving as a reproduction target is acquired in accordance with the motion of a viewer, for example. By a scene being switched in accordance with the motion of the viewer itself, the viewer views how the motion of a 3D object changes interactively.

Figure 4:
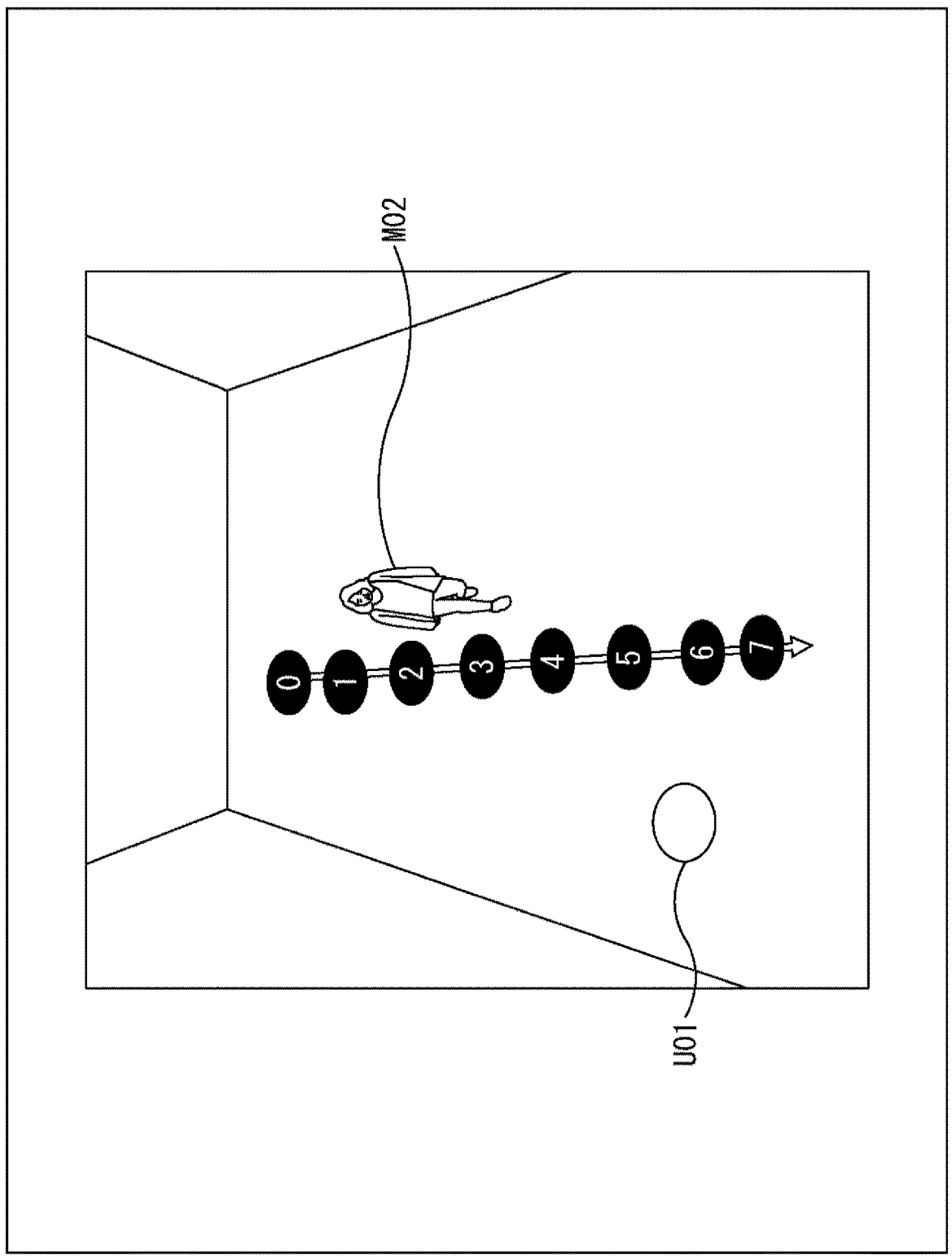
FIG. 4 is a diagram illustrating a specific example of FIG. 3.

FIG. 4 is a diagram illustrating a specific example of a view from a viewer.

In the example illustrated in FIG. 4, a state in which a main scene is reproduced by the video reproduction apparatus is illustrated. Specifically, a scene in which a 3D object M02 of a subject existing within a viewing space is moving by walking toward the lower direction in the drawing is reproduced as a main scene. Here, a black solid ellipse represents a position of the 3D object M02 at each time that is displayed as the main scene. An outlined white number indicates a time.

The state illustrated in FIG. 4 is a state in which the reproduction of frames from the frame of a time 0 to the frame of a time 3 is performed, and the 3D object M02 is moving by walking up to the position corresponding to the frame of the time 3.

A position U01 illustrated at the bottom left of FIG. 4 indicates the position of a viewer within a viewing space. In the example illustrated in FIG. 4, the viewer is viewing at a position distant from the position corresponding to the frame of the time 3 at which the 3D object M02 exists.

In this case, trigger information is not acquired, and the reproduction of only the main scene is continued. In other words, by the reproduction of the frame of the time 3 and subsequent frames being performed, the 3D object 102 sequentially moves by walking up to the position corresponding to the frame of a time 7.

Figure 5:
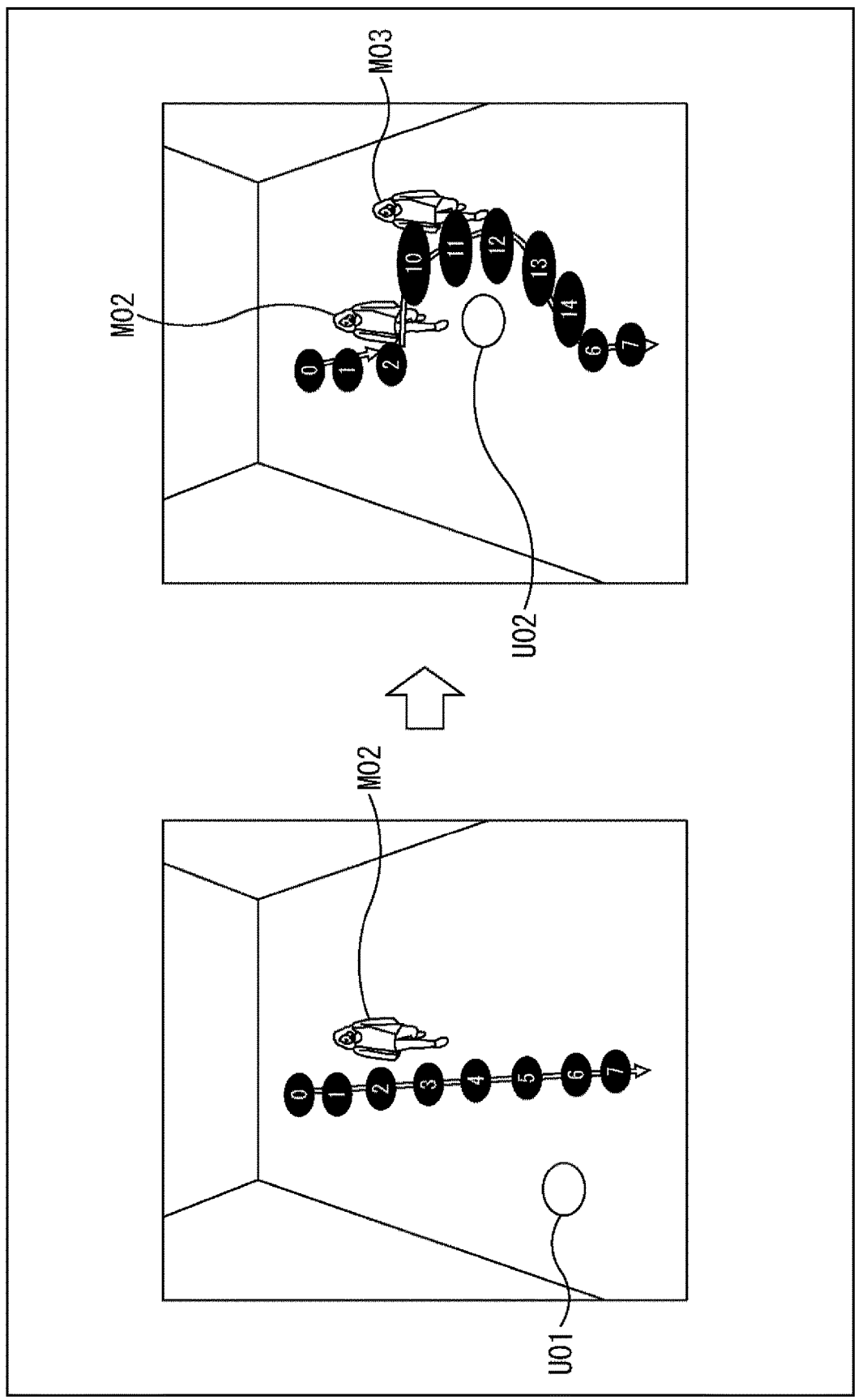
FIG. 5 is a diagram describing a specific example of a switching operation in FIG. 3.

FIG. 5 is a diagram illustrating a specific example of a view in a case where a scene is switched as described with reference to FIG. 3.

As illustrated in FIG. 5, in a case where the reproduction of frames up to the frame of the time 3 of the main scene is performed, and a viewer moves from the position U01 to a position U02 at a timing at which the 3D object M02 of the subject exists at the position corresponding to the frame of the time 3, the video reproduction apparatus acquires trigger information.

Upon acquiring the trigger information, the video reproduction apparatus performs processing for switching a reproduction target from the frame of the time 3 of the main scene to a frame of a time 10 of a sub scene.

The sub scene illustrated in FIG. 5 includes frames of times 10 to 14. The sub scene is a scene in which a 3D object M03 of the subject moves from the position corresponding to the frame of the time 10, toward the position corresponding to the frame of the time 14, in such a manner as to avoid the position U02. Note that the 3D object M02 of the subject included in the main scene and the 3D object M03 of the subject included in the sub scene are 3D objects obtained by capturing images of the same person.

In this example, content reproduced by the video reproduction apparatus includes two scenes corresponding to the main scene illustrated in FIG. 4, and the sub scene serving as a switching destination.

By such switching processing being performed, the viewer existing at the position U02 views the 3D object M02 of the subject moving in such a manner as to avoid the viewer.

By the motion of a 3D object of a subject interactively changing in accordance with a change in the position of the viewer itself, it becomes possible for the viewer to obtain an immersive feeling.

(Configuration Example of First Embodiment)

Figure 6:
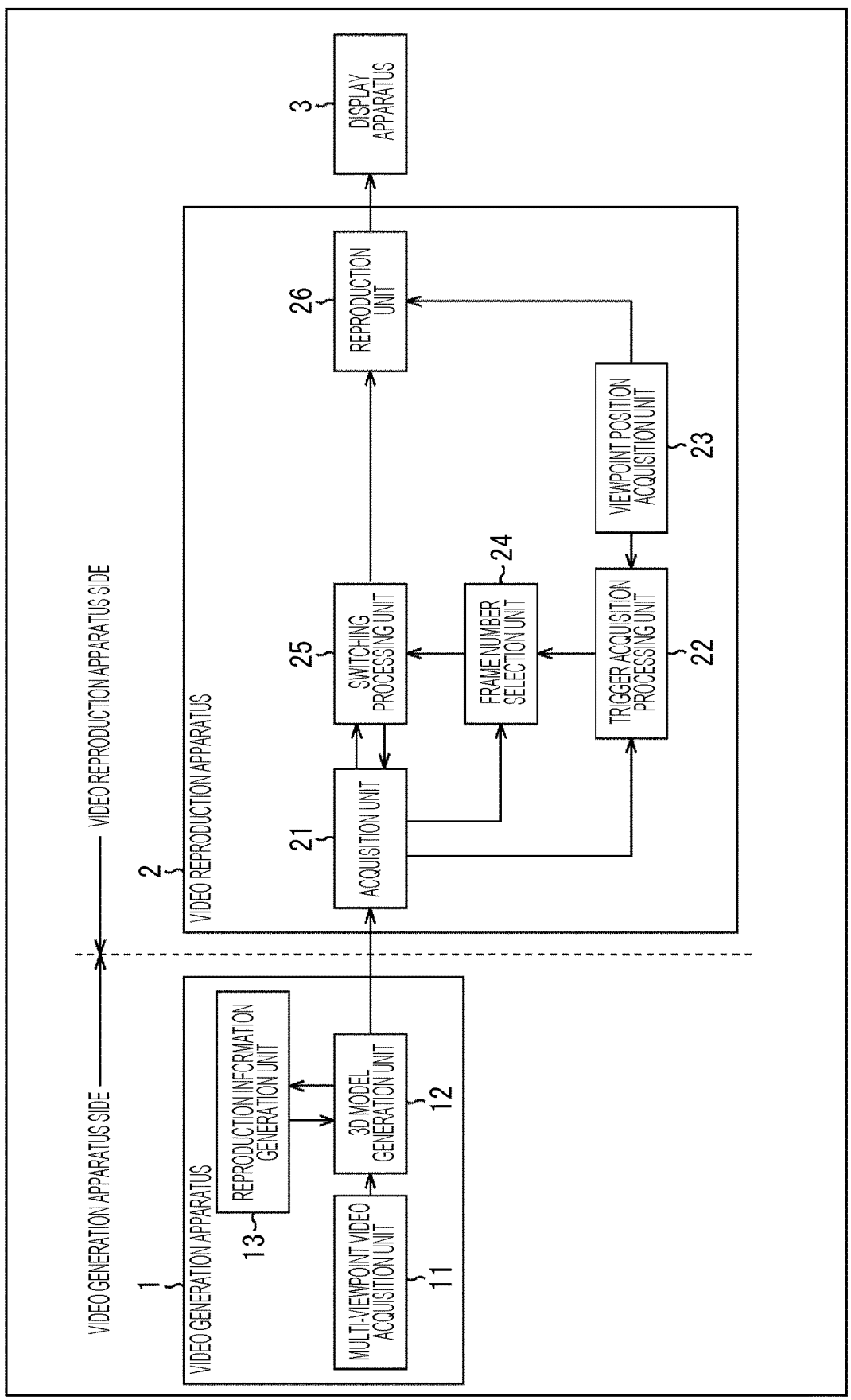
FIG. 6 is a block diagram illustrating a configuration example according to the first embodiment of the present disclosure.

FIG. 6 is a block diagram illustrating one configuration example according to the first embodiment of the present disclosure.

As illustrated in FIG. 6, as information processing system according to the first embodiment of the present disclosure includes a video generation apparatus 1, a video reproduction apparatus 2, and a display apparatus 3. In the first embodiment of the present disclosure, a scene being a 3D shape video is generated, reproduction processing of the generated scene is performed, and the generated scene is displayed.

(Description about Configuration of Video Generation Apparatus)

The video generation apparatus 1 includes a multi-viewpoint video acquisition unit 11, a 3D model generation unit 12, and a reproduction information generation unit 13.

The multi-viewpoint video acquisition unit 11 of the video generation apparatus 1 acquires information regarding a subject (for example, captured 2D video, distance information, and camera parameter) from a plurality of imaging apparatuses, for example, and supplies the information to the 3D model generation unit 12.

The 3D model generation unit 12 generates a 3D object of a subject by performing modeling using the information regarding the subject that is supplied from the multi-viewpoint video acquisition unit 11. The 3D model generation unit 12 generates a scene in which the 3D object of the subject is displayed. For example, a main scene and a sub scene are generated. The 3D model generation unit 12 supplies scene data being data of the generated scene, to the reproduction information generation unit 13.

The 3D model generation unit 12 generates content data from reproduction information supplied from the reproduction information generation unit 13, and the scene data generated by the 3D model generation unit 12, and supplies the generated content data to the video reproduction apparatus 2. The transmission of the content data to the video reproduction apparatus 2 is performed via a network such as the Internet and a local area network (LAN), for example. The transmission of the content data may be performed via a recording medium such as a hard disk drive (HDD) and a flash memory.

The content data may include a plurality or pieces of scene data, or may include only a single piece of scene data. Furthermore, the reproduction information may be separately supplied without being included in the content data.

The reproduction information generation unit 13 selects and sets a main scene or a sub scene, for example, on the basis of the scene data supplied from the 3D model generation unit 12. Furthermore, the reproduction information generation unit 13 generates reproduction information defining the respective reproduction procedures of the main scene and the sub scene, and supplies the reproduction information to the 3D model generation unit 12.

(Description about Configuration of Video Reproduction Apparatus)

The video reproduction apparatus 2 includes an acquisition unit 21, a trigger acquisition processing unit 22, a viewpoint position acquisition unit 23, a frame number selection unit 24, a switching processing unit 25, and a reproduction unit 26.

The acquisition unit 21 of the video reproduction apparatus 2 acquires the content data transmitted from the video generation apparatus 1. The scene data included in the content data is output to the trigger acquisition processing unit 22. Furthermore, scene data selected on the basis of the reproduction information from among scene data included in the content data acquired by the acquisition unit 21 is supplied to the switching processing unit 25 as data of a reproduction target frame.

For example, in a case where the reproduction of the content data is started, the acquisition unit 21 supplies main scene data to the switching processing unit 25. Furthermore, in a case where information identifying a reproduction target is supplied from the switching processing unit 25 in a case where the acquisition unit 21 causes the reproduction of the main scene to be performed by outputting the main scene data to the switching processing unit 25, the acquisition unit 21 stops the output of the main scene data. Then, the acquisition unit 21 supplies a data of a frame of a necessary range of the sub scene that is identified by the information identifying a reproduction target, to the switching processing unit 25 as data of a specific scene.

The reproduction information included in the content data acquired by the acquisition unit 21 is output to the frame number selection unit 24. Information indicating a current reproduction position is also output from the acquisition unit 21 to the frame number selection unit 24. For example, a frame in which scene data is output from the acquisition unit 21 to the switching processing unit 25 corresponds to the frame of the current reproduction position.

The trigger acquisition processing unit 22 supplies trigger information in whether or not to request the switching of a scene, to the frame number selection unit 24 using the scene data supplied from the acquisition unit 21, and viewpoint position information being information regarding a viewing position of a viewer within a viewing space that is supplied from the viewpoint position acquisition unit 23.

Note that the trigger information indicating whether or not to request the switching of a scene is repeatedly output from the trigger acquisition processing unit 22 to the frame number selection unit 21 at a predetermined cycle such as every time the reproduction of each frame is performed. On the basis of the scene data and the viewpoint position information, content (request the switching of a scene/not request the switching) of the trigger information is switched.

The viewpoint position acquisition unit 23 acquires the viewpoint position information, and supplies the viewpoint position information to the trigger acquisition processing unit 22 and the reproduction unit 26. The viewpoint position of the viewer is identified on the basis of information regarding an operation of the viewer that is transmitted from the display apparatus 3, for example. The information regarding an operation of the viewer for moving a viewpoint position as described above, or moving the direction of a line-of-sight is transmitted from the display apparatus 3 to the video reproduction apparatus 2.

The frame number selection unit 24 determines a reproduction target scene and a reproduction target frame number of the scene using the reproduction information supplied from the acquisition unit 21, and the trigger information supplied from the trigger acquisition processing unit 22, and supplies information identifying a reproduction target, to the switching processing unit 25.

The switching processing unit 25 supplies the information identifying a reproduction target that is supplied from the frame number selection unit 24, to the acquisition unit 21 in accordance with the supply of the information identifying a reproduction target, main scene data or sub scene data is supplied from the acquisition unit 21. The switching processing unit 25 supplies the scene data supplied from the acquisition unit 21, to the reproduction unit 26.

The reproduction unit 26 renders a 3D object of a subject on the basis of the scene data supplied from the switching processing unit 25. Then, the reproduction unit 26 transmits a rendering result to the display apparatus 3, and causes the display apparatus 3 to display the 3D object.

The video generation apparatus 1 and the video reproduction apparatus 2 having the above-described configurations each include an apparatus such as a personal computer (PC), smartphone, a tablet terminal, and a game machine. On the other hand, the display apparatus 3 being a viewing device includes a display, an HMD, or the like as described above.

The configurations of two or more apparatuses illustrated in FIG. 6 may be provided in one apparatus. For example, the video generation apparatus 1 and the video reproduction apparatus 2 may be included in one apparatus. Alternatively, the video reproduction apparatus 2 and the display apparatus 3 may be included in one apparatus. Furthermore, the configurations of one apparatus illustrated in FIG. 6 may be separately provided in a plurality of apparatuses.

Next, an operation of each apparatus having the above-described configuration will be described.

(Operation of Each Apparatus in First Embodiment)

(3D Model Data Generation Processing of Video Generation Apparatus))

Figure 7:
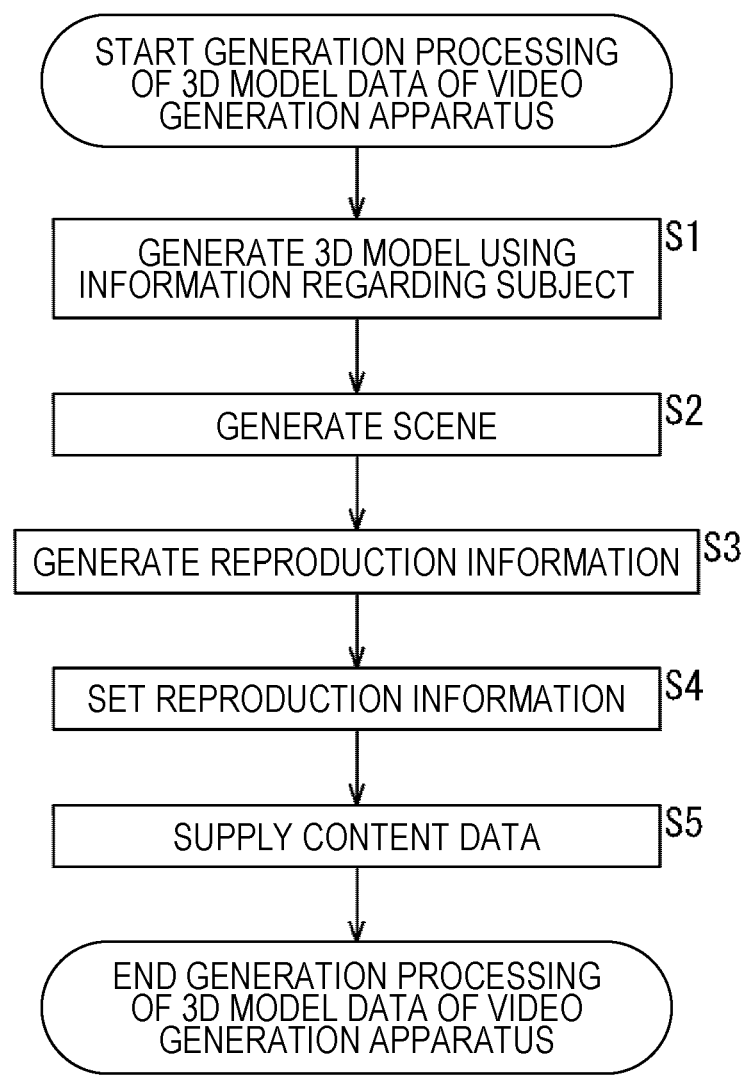
FIG. 7 is a flowchart describing generation processing performed by a video generation apparatus 1 in FIG. 6.

FIG. 7 is a flowchart describing generation processing performed by the video generation apparatus 1.

The processing illustrated in FIG. 7 is started when information regarding a subject that is acquired from a plurality of imaging apparatuses is supplied from the multi-viewpoint video acquisition unit 11 of the video generation apparatus 1 to the 3D model generation unit 12, for example.

In Step S1 of FIG. 7, the 3D model generation unit 12 generates a 3D object of a subject being a 3D model, using the information regarding the subject.

In Step S2, the 3D model generation unit 12 generates a scene using the 3D object of the subject that represents a series of motions. In a case where there is a plurality of series of motions, here, a scene corresponding to each series of motions is individually generated.

In step S3, the reproduction information generation unit 13 selects and sets a main scene or a sub scene, for example, on the basis of the scene data supplied from the 3D model generation unit 12. The reproduction information generation unit 13 generates reproduction information defining the respective reproduction procedures of the main scene and the sub scene, and supplies the reproduction information to the 3D model generation unit 12.

In Step S4, the 3D model generation unit 12 sets the reproduction information supplied from the reproduction information generation unit 13, in scene data, and generates content data including the scene data in which the reproduction information is set.

In Step S5, the 3D model generation unit 12 transmits the content data generated in Step S4, to the video reproduction apparatus 2. After that, the generation processing of the video generation apparatus 1 ends.

(3D Model Data Reproduction Processing of Video Reproduction Apparatus)

Figure 8:
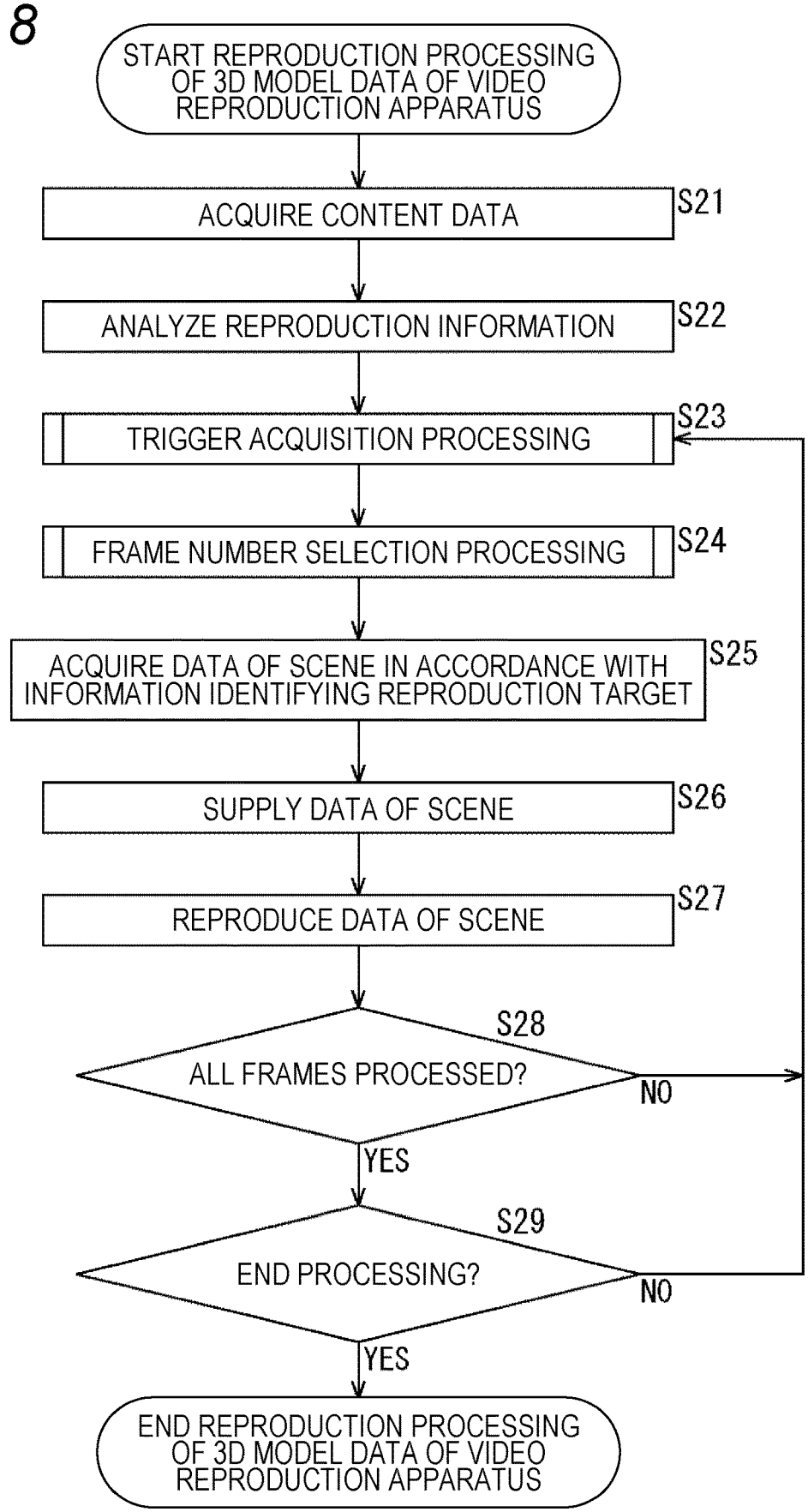
FIG. 8 is a flowchart describing reproduction processing performed by a video reproduction apparatus 2 FIG. 6.

FIG. 8 is a flowchart describing reproduction processing performed by the video reproduction apparatus 2.

In Step S21 of FIG. 8, the acquisition unit 21 of the video reproduction apparatus 2 acquires the content data supplied from the 3D model generation unit 12 of the video generation apparatus 1.

In Step S22, the acquisition unit 21 analyzes the reproduction information included in the acquired content data.

In Step S23, the trigger acquisition processing unit 22 performs trigger acquisition processing. In the trigger acquisition processing, on the basis of the content data supplied from the acquisition unit 21, and a state of the viewer, trigger information indicating whether or not to request the switching of a reproduction target to a sub scene is acquired. The details of the trigger acquisition processing will be described later with reference to the flowchart illustrated in FIG. 9.

In Step S24, the frame number selection unit 24 performs frame number selection processing. In the frame number selection processing, on the basis of the trigger information supplied from the trigger acquisition processing unit 22, and the reproduction information included in the content data supplied from the acquisition unit 21, a reproduction target scene and a reproduction target frame number in the scene are determined as information identifying a reproduction target. The details of the frame number selection processing will be described later with reference to the flowchart illustrated in FIG. 10.

In Step S25, the switching processing unit 25 supplies the information identifying a reproduction target that is supplied from the frame number selection unit 24, to the acquisition unit 21. In accordance with the information identifying a reproduction target that has been supplied from the switching processing unit 25, the acquisition unit 21 supplies data of the reproduction target scene to the switching processing unit 25.

Data of a frame of a main scene or a frame of a sub scene is supplied from the acquisition unit 21 to the switching processing unit 25.

In Step S26, the switching processing unit 25 supplies the date of the scene that has been supplied from the acquisition unit 21 in Step S25, to the reproduction unit 26.

In Step S27, the reproduction unit 26 renders a 3D object of a subject on the basis of the data of the scene that is supplied from the switching processing unit 25. On the basis of a rendering result, the display of the 3D object is performed on the display apparatus 3.

In Step S28, the switching processing unit 25 determines whether or not all frames of the reproduction target scene have been processed. In a case where it is determined that an unprocessed frame exists, the processing returns to Step S23, and the processing in Step S23 and subsequent steps is repeated.

On the other hand, in a case where it is determined in Step S28 that all frames of the reproduction target scene have been processed, the processing proceeds to Step S29.

In Step S29, whether or not to end the reproduction processing is determined. In a case where it is determined that the reproduction processing is not to be ended, the processing returns to Step S23, and the processing in Step S23 and subsequent steps is repeated.

On the other hand, in a case where it is determined in Step S29 that the reproduction processing is to be ended, the reproduction processing of the video reproduction apparatus 2 ends.

(Trigger Acquisition Processing)

Figure 9:
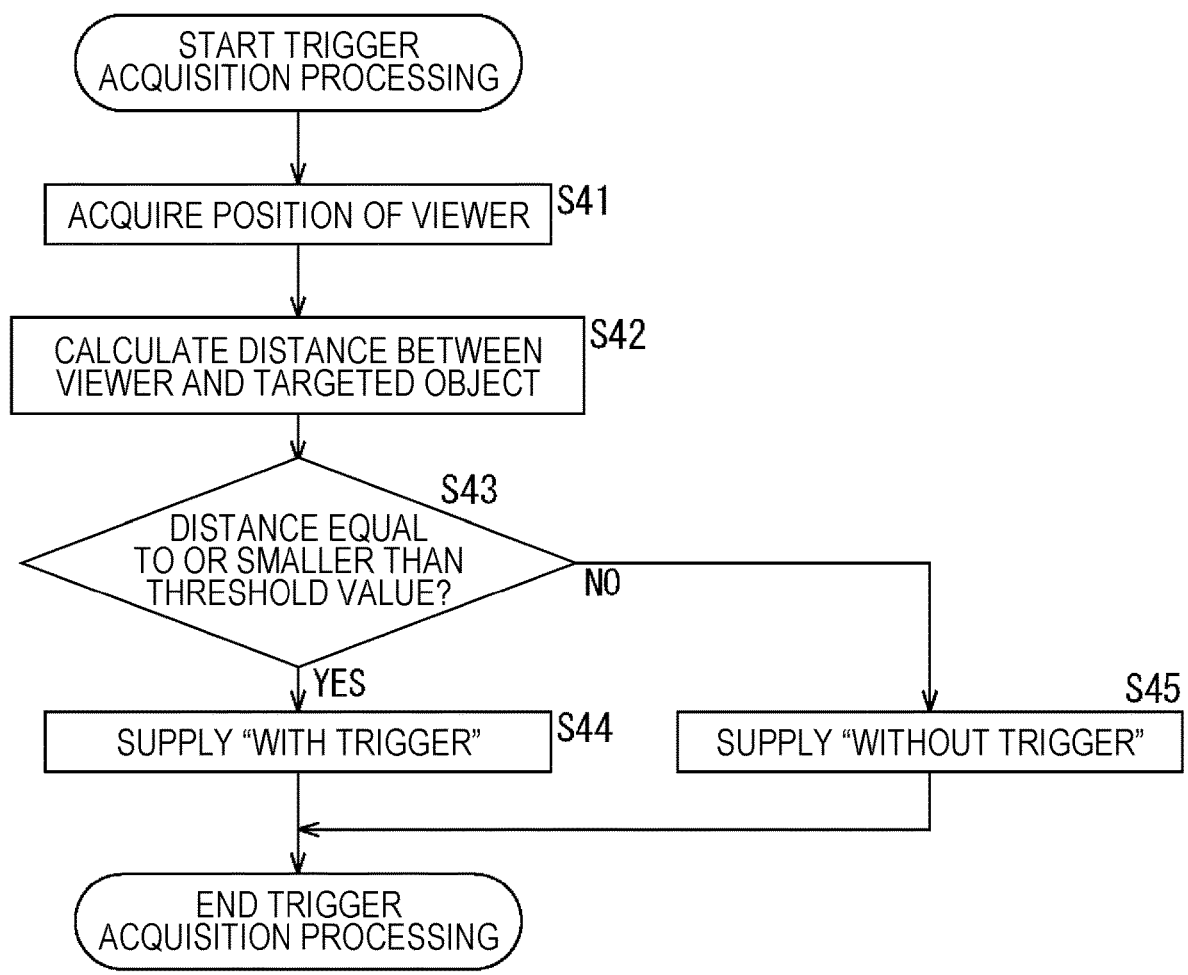
FIG. 9 is a flowchart describing trigger acquisition processing in FIG. 8.

Next, an example of a flow of the trigger acquisition processing executed in Step S23 of FIG. 8 will be described with reference to the flowchart illustrated in FIG. 9.

If the trigger acquisition processing is started, in Step S41, the trigger acquisition processing unit 22 acquires viewpoint position information from the viewpoint position acquisition unit 23. The viewpoint position acquisition unit 23 repeatedly acquires a viewing position of a viewer within a viewing space.

In Step S42, the trigger acquisition processing unit 22 acquires data of a scene that is supplied by the acquisition unit 21 to the switching processing unit 25. On the basis of the acquired data, the trigger acquisition processing unit 22 calculates a distance between a viewing position of a viewer within a viewing space and a targeted object.

In Step S43, the trigger acquisition processing unit 22 determines whether or not the distance between the viewing position of the viewer and the targeted object is equal to or smaller than a predefined threshold value.

In a case where it is determined in Step S43 that the distance between the viewing position of the viewer and the targeted object is equal to or smaller than the Threshold value, the processing proceeds to Step S44.

In Step S44, on the basis of the determination made in the processing in Step S43, the trigger acquisition processing unit 22 generates trigger information indicating "with trigger" for requesting the switching to a sub scene, and supplies the generated trigger information to the frame number selection unit 24.

On the other hand, in a case where it is determined in Step S43 that the distance between the viewing position of the viewer and the targeted object is larger than the threshold value, the processing proceeds to Step S45.

In Step S45, on the basis of the determination made in the processing in Step S43, the trigger acquisition processing unit 22 generates trigger information indicating "without trigger" for not requesting the switching to a sub scene, and supplies the generated trigger information to the frame number selection unit 24.

If trigger information is supplied in the processing in Step S44 or S45, the trigger acquisition processing ends, and the processing returns to Step S23 of FIG. 8.

(Flow of Frame Number Selection Processing)

Figure 10:
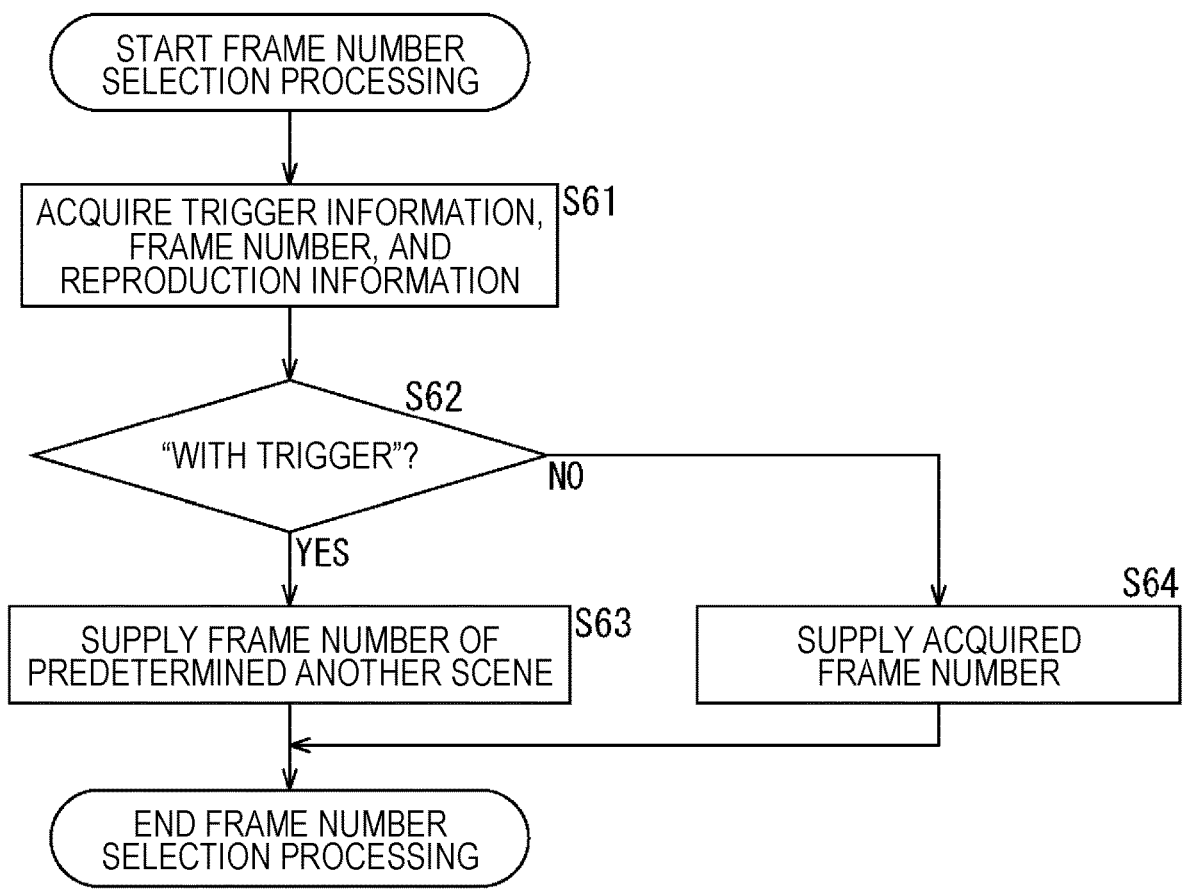
FIG. 10 is a flowchart describing frame number selection processing in FIG. 8.

Next, an example of a flow of the frame number selection processing executed in Step S24 of FIG. 8 will be described with reference to the flowchart illustrated in FIG. 10.

If the frame number selection processing is started, in Step S61, the frame number selection unit 24 acquires the trigger information supplied from the trigger acquisition processing unit 22, the reproduction information supplied from the acquisition unit 21, and information indicating the current reproduction position.

In Step S62, the frame number selection unit 24 determines whether or not the trigger information acquired in the processing in Step S61 includes information indicating "with trigger" for requesting the switching to a sub scene.

In a case where it is determined in Step S62 that the trigger information acquired in Step S61 includes information indicating "with trigger", the processing proceeds to Step S63.

In Step S63, the frame number selection unit 24 determines a frame number of a predefined switching target sub scene from the reproduction information acquired in Step 361, The frame number selection unit 24 supplies the determined sub scene and the frame number of the scene to the switching processing unit 25 as information identifying a reproduction target. The information supplied to the switching processing unit 25 includes, for example, information indicating a reproduction target scene, and information indicating a frame number of a frame in the scene that corresponds to a reproduction start position.

On the contrary, in a case where it is determined in Step S62 that the trigger information acquired in Step S61 does not include information indicating "with trigger", the processing proceeds to Step S64.

In Step S64, the frame number selection unit 24 acquires a frame number of a frame to be reproduced subsequent to the current reproduction position acquired in Step S61. Because trigger information including information indicating "without trigger" has been acquired, here, a frame number of a frame included in a main scene is acquired. The frame number selection unit 24 supplies the acquired frame number to the switching processing unit 25 as information identifying a reproduction target.

If information identifying a reproduction target is supplied to the switching processing unit 25 in the processing in Step S63 or S64, the frame number selection processing ends, and the processing returns to Step S24 of FIG. 8.

After that, in a case where information including a frame number of a switching target sub scene is supplied from the frame number selection unit 24 to the switching processing unit 25, a reproduction target scene is switched from the main scene to the sub scene, and the reproduction of the sub scene is performed (Step S25 of FIG. 8).

By the above-described processing, in accordance with a positional relationship between the state of a viewer being a viewer and a 3D object of a subject within a viewing space, the motion of the 3D object of the subject interactively changes. It thereby becomes possible for the viewer to obtain an immersive feeling.

Second Embodiment

Next, a second embodiment will be described.

As described above, in the first embodiment, in accordance with a viewing position of a viewer getting closer to a 3D object, trigger information requesting the switching to a sub scene is promptly output, and the reproduction of the sub scene is started. The motion of the 3D object thereby changes.

Nevertheless, a main scene serving as a switching source and a sub scene serving as a switching destination include chronologically-arranged frames including 3D objects representing respective different series of operations.

Thus, if the switching between such scenes is performed on the basis of only a timing of trigger information, because a 3D object of a subject is instantly switched between frames of scenes of different operations, there is concern that a feeling of strangeness is provided to a viewer being a viewer and an immersive feeling of the viewer is impaired.

For example, in a case where the motion of a 3D object in a switching source frame and the motion of a 3D object in a switching destination frame are totally different, the viewer feels a feeling of strangeness.

In view of the foregoing, in the second embodiment, metadata for switching of a scene is generated on a video generation apparatus side, and the metadata is provided to a video reproduction apparatus side. In a video generation apparatus, frames considered not to provide a feeling of strangeness in the motion of a 3D object even if a scene is switched are selected as a switching source frame and a switching destination frame, and metadata indicating the selected frames is generated.

With this configuration, it is possible to seamlessly switch between frames of scenes of different operations, and prevent an immersive feeling of a viewer from being impaired.

(Overview of Operation in Second Embodiment)

Figure 11:
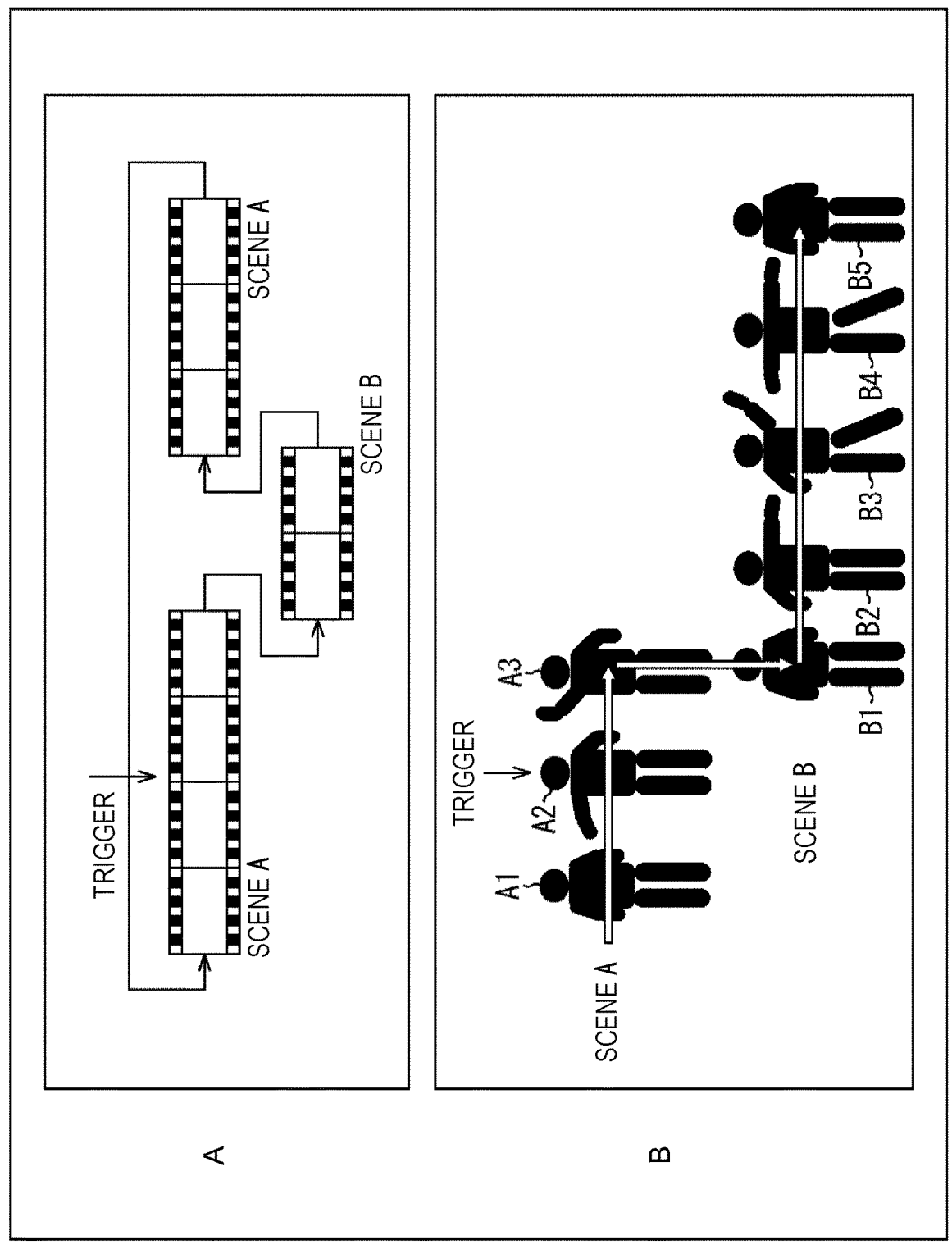
FIG. 11 is a diagram describing an overview of a switching operation example according to a second embodiment of the present disclosure.

FIG. 11 is a diagram describing an overview of an operation example of switching scenes according to a second embodiment of the present disclosure.

As illustrated in "A" of FIG. 11, for example, content includes two scenes corresponding to the scene A serving as a main scene, and the scene B serving as a sub scene.

If trigger information requesting the switching of a video is acquired in a certain frame of the scene A being reproduced by the video reproduction apparatus, the video reproduction apparatus determines whether or not a scene to be reproduced can be switched to the scene B.

In a case where it is determined that the frame cannot be switched to the scene B, the video reproduction apparatus continues the reproduction of the scene A up to a frame that can be switched to the scene B, and then switches a scene to be reproduced, to the scene B.

Whether or not a scene to be reproduced can be switched to another scene is indicated by metadata associated with each frame. In a case where the video reproduction apparatus acquires trigger information requesting the switching of a video, the video reproduction apparatus determines whether or not a reproduction target frame of the scene A is a frame that can be switched to a frame of another scene, on the basis of the metadata.

After switching a scene to be reproduced, to the scene B, the video reproduction apparatus performs the reproduction of the scene B. If the reproduction of the scene B ends, the video reproduction apparatus switches a reproduction target to a predefined frame of the scene A, and subsequently, continues the reproduction of the scene A.

Switching processing from the scene A to the scene B will be specifically described.

As indicated by a down-pointing arrow illustrated in "B" of FIG. 11, for example, it is assumed that trigger information requesting the switching of a video is acquired in the frame A2 of the scene A. In this case, upon acquiring the trigger information, the video reproduction apparatus determines whether or not a scene to be reproduced can be switched to another scene representing a different motion, on the basis of the metadata.

For example, in a case where it is determined that the frame A2 is a frame that cannot be switched to another scene, the video reproduction apparatus continues the reproduction of the scene A up to the frame A3 that can be switched to another scene, and then switches a scene to be reproduced, to the frame B1 of the scene B.

In this manner, determination as to whether or not switching of a scene can be performed is performed on the basis of metadata for switching. The identification of the frame B1 serving as a switching destination is also performed on the basis of the metadata.

Figure 12:
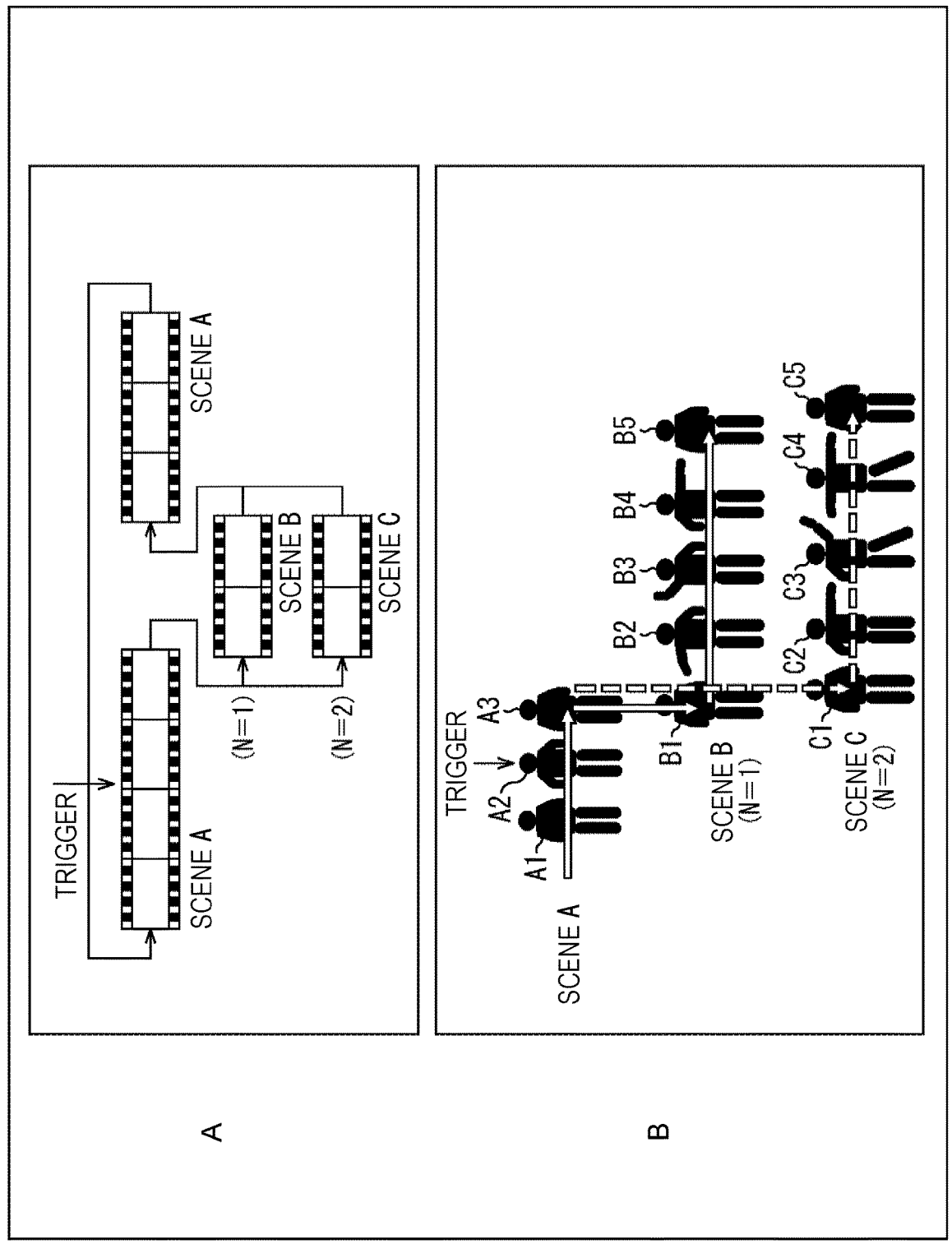
FIG. 12 is a diagram describing an application example of a switching operation in FIG. 11.

FIG. 12 is a diagram describing an application example of a switching operation in FIG. 11.

In "A" of FIG. 12, for example, content includes three scenes corresponding to the scene A serving as a main scene, and the scenes B and C serving as sub scenes.

If trigger information requesting the switching of a video is acquired in a certain frame of the scene A being reproduced by the video reproduction apparatus, the video reproduction apparatus determines whether or not a scene to be reproduced can be switched to another scene representing a different motion. In a case where it is determined that the frame cannot be switched the other scene, the video reproduction apparatus continues the reproduction of the scene A up to a frame that can be switched to the other scene.

Furthermore, at the same time, the video reproduction apparatus acquires the number of viewing experiences N indicating the number of times switching of a scene is performed.

The video reproduction apparatus continues the reproduction of the scene A up to the frame A3 being a frame that can be switched to another scene, and then switches a scene to be reproduced, in accordance with the number of viewing experiences. In the example illustrated in "A" of FIG. 12, in a case where the number of viewing experiences N is one, the scene A is switched to the scene B, and in a case where the number of viewing experiences N is two, the scene A is switched to the scene C.

In this example, a scene (frame) serving as a switching destination is switched in accordance with the number of viewing experiences. In a case where the reproduction of the scene A is performed up to the last frame of the scene A through another scene or the like, a frame to be reproduced returns to a top frame of the scene A, and the reproduction of the scene A is repeated.

A scene serving as a switching destination may be switched in accordance with another standard such as a viewing time or a viewing day, instead of being switched in accordance with the number of viewing experiences.

A specific example of the switching processing in "A" of FIG. 12 will be described.

As indicated by a down-pointing arrow illustrated in "B" of FIG. 12, for example, it is assumed that trigger information requesting the switching of a video is acquired in the frame A2 of the scene A. In this case, upon acquiring the trigger information, the video reproduction apparatus determines whether or not a scene to be reproduced can be switched to another scene representing a different motion.

For example, in a case where it is determined that the frame A2 is a frame that cannot be switched to another scene, the video reproduction apparatus continues the reproduction of the scene A up to the frame A3 that can be switched to another scene.

At the same time, the video reproduction apparatus acquires the number of viewing experiences.

After the video reproduction apparatus continues the reproduction of the scene A up to the frame A3 that can be switched to another scene, in a case where the number of viewing experiences N is one, the video reproduction apparatus switches a scene to be reproduced, to the frame B1 of the scene B, and in a case where the number of viewing experiences N is two, switches a scene to be reproduced, to the frame C1 of the scene C.

A configuration example of metadata for switching (hereinafter, will also be referred to as switching metadata) will be described with reference to FIG. 13.

In the example illustrated in FIG. 13, content includes the three scenes corresponding to the scene A, the scene B, and the scene C, which have been described with reference to FIG. 2. Because the frame configuration of each scene is the same as that described with reference to FIG. 2, the description will be omitted.

Figure 13:
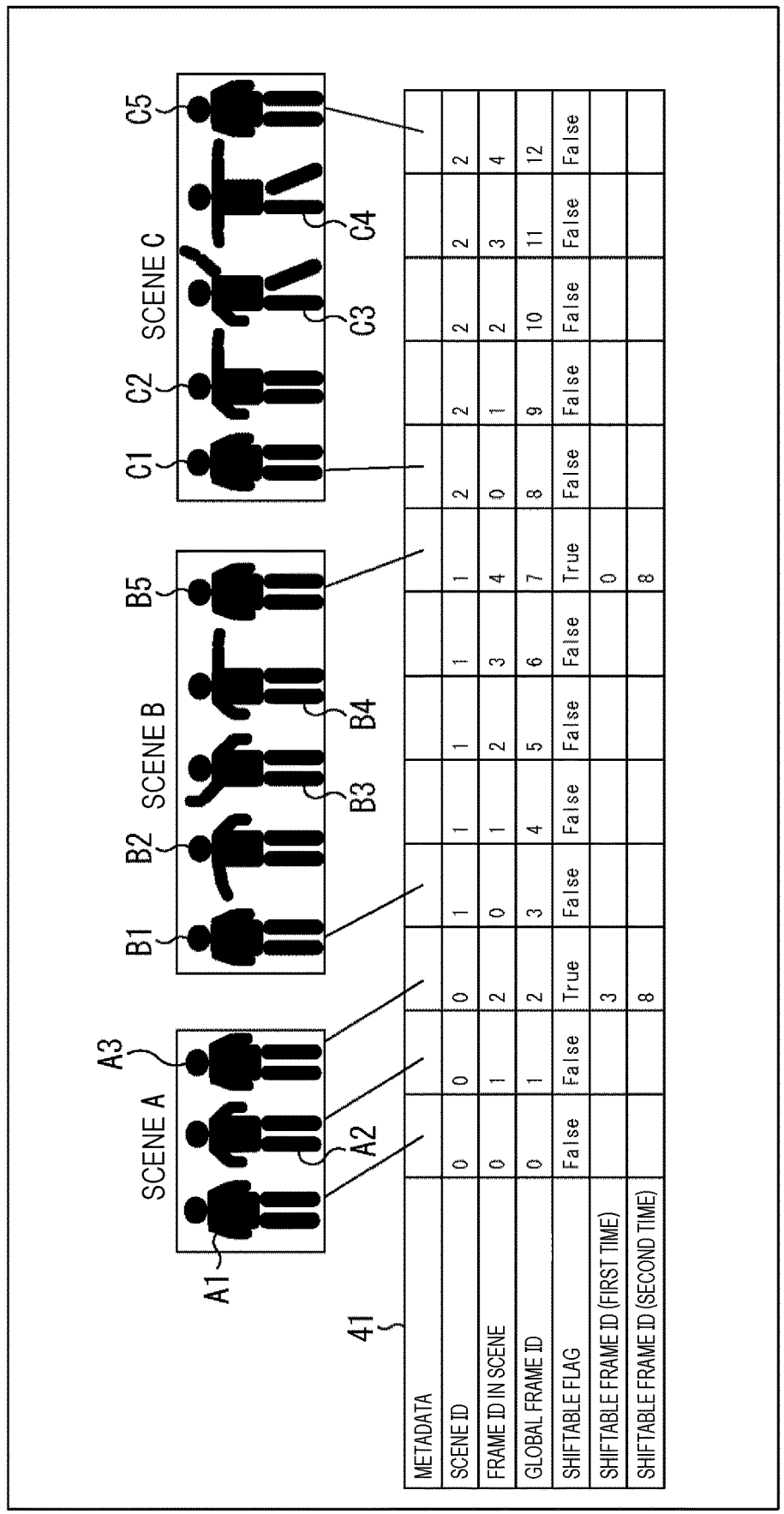
FIG. 13 is a diagram illustrating a configuration example of switching metadata according to the second embodiment of the present disclosure.

Each piece of information included in switching metadata 41 in FIG. 13 is described so as to correspond to each frame of the scenes.

As illustrated in FIG. 13, the switching metadata 41 includes a scene ID, a frame ID in a scene, a global frame ID, a shiftable flag, and a shiftable frame ID (N-th time). Here, a variable N of the shiftable frame ID (N-th time) means the number of viewing experiences.

The scene ID in the switching metadata 41 is identification information indicating a scene to which each frame belongs. Here, scene ID=0 indicates that a corresponding frame belongs to the scene A, scene ID=1 indicates that a corresponding frame belongs to the scene B, and scene ID=2 indicates that a corresponding frame belongs to the scene C.

The frame ID in a scene is identification information of a target frame in each scene. In the example illustrated in FIG. 13, identification information corresponding to a frame number is set as a frame ID in a scene. For example, it is indicated that a frame with scene ID=0 and frame ID in scene=0 belongs to the scene A, and is a frame corresponding to the frame A1 in the scene A. The same applies to other frame IDs in scene.

A global frame ID is identification information of a target frame in the scene A, the scene B, and the scene C, which are all scenes included in the content. Here, values from 0 to 12 are respectively allocated as global frame IDs to the frames A1 to A3 of the scene A, the frames B1 to B5 of the scene B, and the frames C1 to C5 of the scene C.

For example, global frame ID=0 indicates the frame A1 of the scene A, global frame ID=3 indicates the frame B1 of the scene B, and global frame ID=8 indicates the frame C1 of the scene C. The same applies to other global frame IDs.

The shiftable flag is flag information indicating whether or not a target frame is a frame shiftable (switchable) to a frame of another scene. The shiftable flag corresponds to the metadata used for the above-described determination as to whether or not a scene to be reproduced can be switched to another scene.

For example, a shiftable flag of the frame A2 of the scene A corresponding to global frame ID=1 is set to False. In this case, it is determined that the frame A2 of the scene A cannot shift to a frame of another scene.

Further, a shiftable flag of the frame A3 of the scene A corresponding to global frame ID=2 is set to True. In this case, it is determined that the frame A3 of the scene A can shift to a frame of another scene.

The value (True/False) of the shiftable flag is determined on the basis of a similarity between shapes of 3D objects of a subject. The similarity between shapes is calculated by comparing the shapes of 3D objects of the subject in the respective frames of each scene in content.

For example, in a case where a similarity is equal to or larger than a threshold value, a 3D object of the subject in a comparison source frame and a 3D object of the subject in a comparison destination frame are 3D objects having similar shapes. In this case, a shiftable flag of the comparison source frame is set to True.

On the other hand, in a case where a similarity is smaller than the threshold value, a 3D object of the subject in a comparison source frame and a 3D object of the subject in a comparison destination frame are 3D objects having dissimilar shapes. In this case, a shiftable flag of the comparison source frame is set to a value of False indicating that the frame cannot shift to a frame of another scene.

There are various methods as a calculation method of a similarity, between shapes. For example, there is a method of calculating a Hausdorff distance of vertex coordinates between two meshes.

A shiftable frame ID in the switching metadata 41 is information indicating a global frame ID of a shift destination frame of a frame having a shiftable flag indicating True. For example, in a case where a shiftable frame ID of the frame A3 of the scene A corresponding to global frame ID=2 that has a shiftable flag indicating True is shiftable frame ID=3, this case indicates that a frame can be shiftable from the frame A3 of the scene A corresponding to global frame ID=2, to the frame B1 of the scene B corresponding to global frame ID=3.

Note that a shiftable frame ID indicating a shift destination may have a format of designating different shift destinations depending on the number of viewing experiences N.

For example, a shiftable frame ID (first time) indicates a pattern of a shiftable frame in a case where a viewer views the scene B being a sub scene for the first time, that is to say, in a case where the number of viewing experiences N is one. In a similar manner, a shiftable frame ID (second time) indicates a pattern of a shiftable frame in a case where the viewer views the sub scene for the second time, that is to say, in a case where the number of viewing experiences N is two.

In FIG. 13, as a shiftable frame ID (second time) of the frame A3 of the scene A corresponding to global frame ID=2, shiftable frame ID (second time)=8 different from shiftable frame ID (first time)=3 is set. This indicates that, in a case where the viewer views the sub scene for the first time, the switching to another frame from the frame A3 of the scene A corresponding to global frame ID=2 is performed in such a manner as to switch to the frame E1 of the scene B, and in a case where the viewer views the sub scene for the second time, the switching is performed in such a manner as to switch to the frame C1 of the scene C, which is a frame of a different scene from the scene in the first viewing.

(Configuration Example of Second Embodiment)

Figure 14:
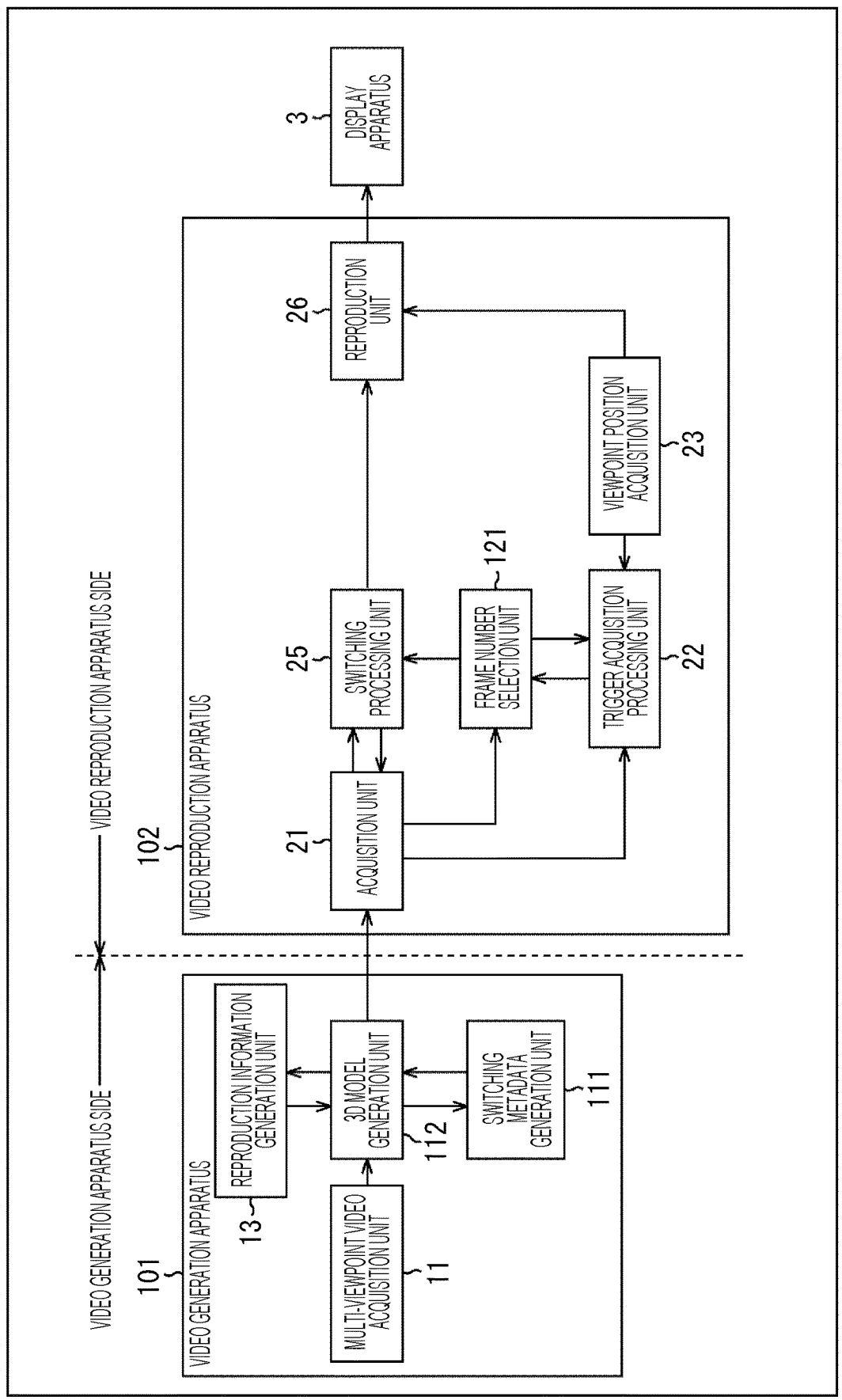
FIG. 14 is a block diagram illustrating a configuration example according to the second embodiment of the present disclosure.

FIG. 14 is a block diagram illustrating one configuration example according to the second embodiment of the present disclosure.

Among the configurations illustrated in FIG. 14, the same configurations as the configurations illustrated in FIG. 6 are assigned the same reference numerals. The redundant descriptions will be appropriately omitted. The same applies to other block diagrams to be described later.

(Description about Configuration of Video Generation Apparatus)

The configuration of a video generation apparatus 101 illustrated in FIG. 14 is different from the configuration of the video generation apparatus 1 illustrated in FIG. 6 in that a 3D model generation unit 112 is provided in place of the 3D model generation unit 12, and a switching metadata generation unit 111 is newly provided.

The switching metadata generation unit 111 of the video generation apparatus 101 illustrated in FIG. 14 generates the switching metadata illustrated in FIG. 13, on the basis of scene data supplied from the 3D model generation unit 12, and reproduction information, and supplies the switching metadata to the 3D model generation unit 112. For example, the reproduction information supplied from the 3D model generation unit 112 is used for determining a value to be set to a shiftable flag illustrated in FIG. 13.

The 3D model generation unit 112 generates content data from the switching metadata supplied from the switching metadata generation unit 111, the reproduction information supplied from the reproduction information generation unit 13, and scene data generated by the 3D model generation unit 112, and transmits the generated content data to a video reproduction apparatus 102.

Note that the switching metadata may be separately supplied without being included in the content data.

(Description about Configuration of Video Reproduction Apparatus)

The configuration of the video reproduction apparatus 102 illustrated in FIG. 14 is different from the configuration of the video reproduction apparatus 2 illustrated in FIG. 6 in that a frame number selection unit 121 is provided in place of the frame number selection unit 24.

The trigger acquisition processing unit 22 supplies trigger information indicating whether or not to request the switching of a scene, to the frame number selection unit 121 using the scene data supplied from the acquisition unit 21 and the viewpoint position information supplied from the viewpoint position acquisition unit 23.

Note that the trigger information indicating whether or not to request the switching of a scene is repeatedly output from the trigger acquisition processing unit 22 to the frame number selection unit 121 at a predetermined cycle such as every time the reproduction of each frame is performed. On the basis of the scene data and the viewpoint position information, content (request the switching of a scene/not request the switching) of the trigger information is switched.

After supplying the trigger information requesting the switching of a scene, to the frame number selection unit 121, the trigger acquisition processing unit 22 sets the trigger information to information including content not requesting the switching of a scene, in accordance with the setting performed by the frame number selection unit 121.

The frame number selection unit 121 determines a reproduction target scene, and a frame number of a reproduction target frame in the scene, using information indicating the current reproduction position that is supplied from the acquisition unit 21, the switching metadata, and the trigger information supplied from the trigger acquisition processing unit 22, and supplies the information identifying a reproduction target, to the switching processing unit 25.

After supplying the information identifying a reproduction target, to the switching processing unit 25, the frame number selection unit 121 supplies, to the trigger acquisition processing unit 22, information for instructing trigger information to be set to information including content not requesting the switching of a scene.

Next, an operation of each apparatus having the above-described configuration will be described.

(Operation of Each Apparatus in Second Embodiment)

(3D Model Data Generation Processing of Video Generation Apparatus)

Figure 15:
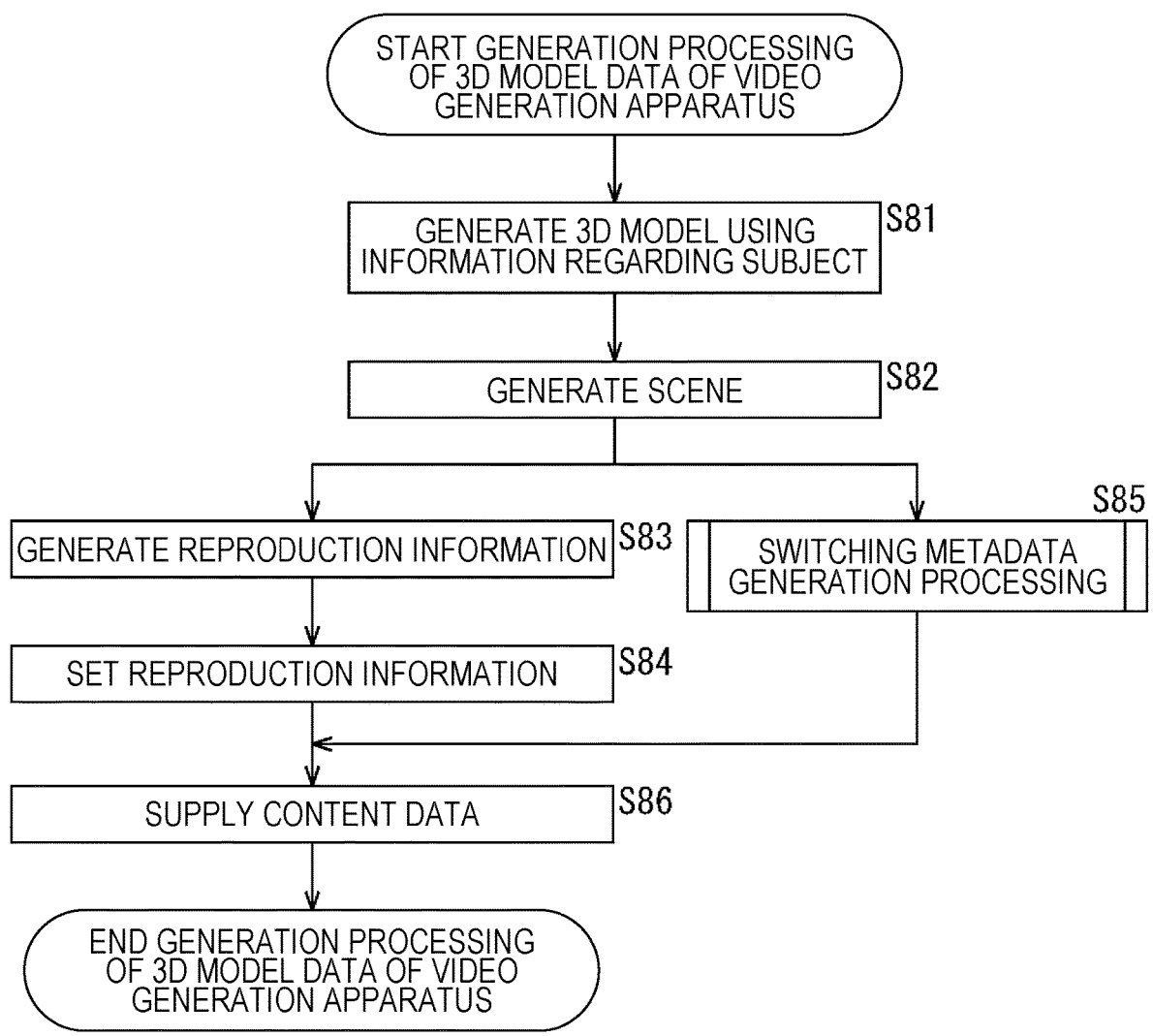
FIG. 15 is a flowchart describing processing performed by a video generation apparatus 101 in FIG. 14.

FIG. 15 is a flowchart describing generation processing performed by the video generation apparatus 101.

The processing illustrated in FIG. 15 is processing basically similar to the processing described with reference to FIG. 7 except that processing of generating switching metadata is added. The redundant descriptions will be appropriately omitted.

In Step S81 of FIG. 15, the 3D model generation unit 112 generates a 3D object of a subject being a 3D model, using the information regarding the subject supplied from the multi-viewpoint video acquisition unit 11.

In Step S82, the 3D model generation unit 112 generates a scene using the 3D object of the subject that represents a series of motions. In a case where there is a plurality, of series of motions, here, a scene corresponding to each series of motions is individually generated.

In step S83, the reproduction information generation unit 13 selects and sets a main scene or a sub scene, for example, on the basis of the scene data supplied from the 3D model generation unit 112. The reproduction information generation unit 13 generates reproduction information defining the respective reproduction procedures of the main scene and the sub scene, and supplies the reproduction information to the 3D model generation unit 112.

In Step S84, the 3D model generation unit 112 sets the reproduction information supplied from the reproduction information generation unit 13, in scene data, and generates content data including the scene data in which the reproduction information is set.

In Step S85, the switching metadata generation unit 111 performs switching metadata generation processing. As necessary, the switching metadata generation processing is performed concurrently with the processing in Steps S83 and S84.

In the switching metadata generation processing, switching metadata is generated on the basis of the scene data supplied from the 3D model generation unit 112, and the reproduction information, and the generated switching metadata is supplied to the 3D model generation unit 112. The details of the switching metadata generation processing will be described later with reference to the flowchart illustrated in FIG. 16.

In Step S86, the 3D model generation unit 112 stores the switching metadata generated in Step S85, into the content data generated in Step S84, and supplies the content data and the switching metadata to the video reproduction apparatus 102. After that, the generation processing of the video generation apparatus 101 ends.

Note that the switching metadata may be supplied to the video reproduction apparatus 102 separately from the content data.

(Processing of Switching Metadata Generation)

Figure 16:
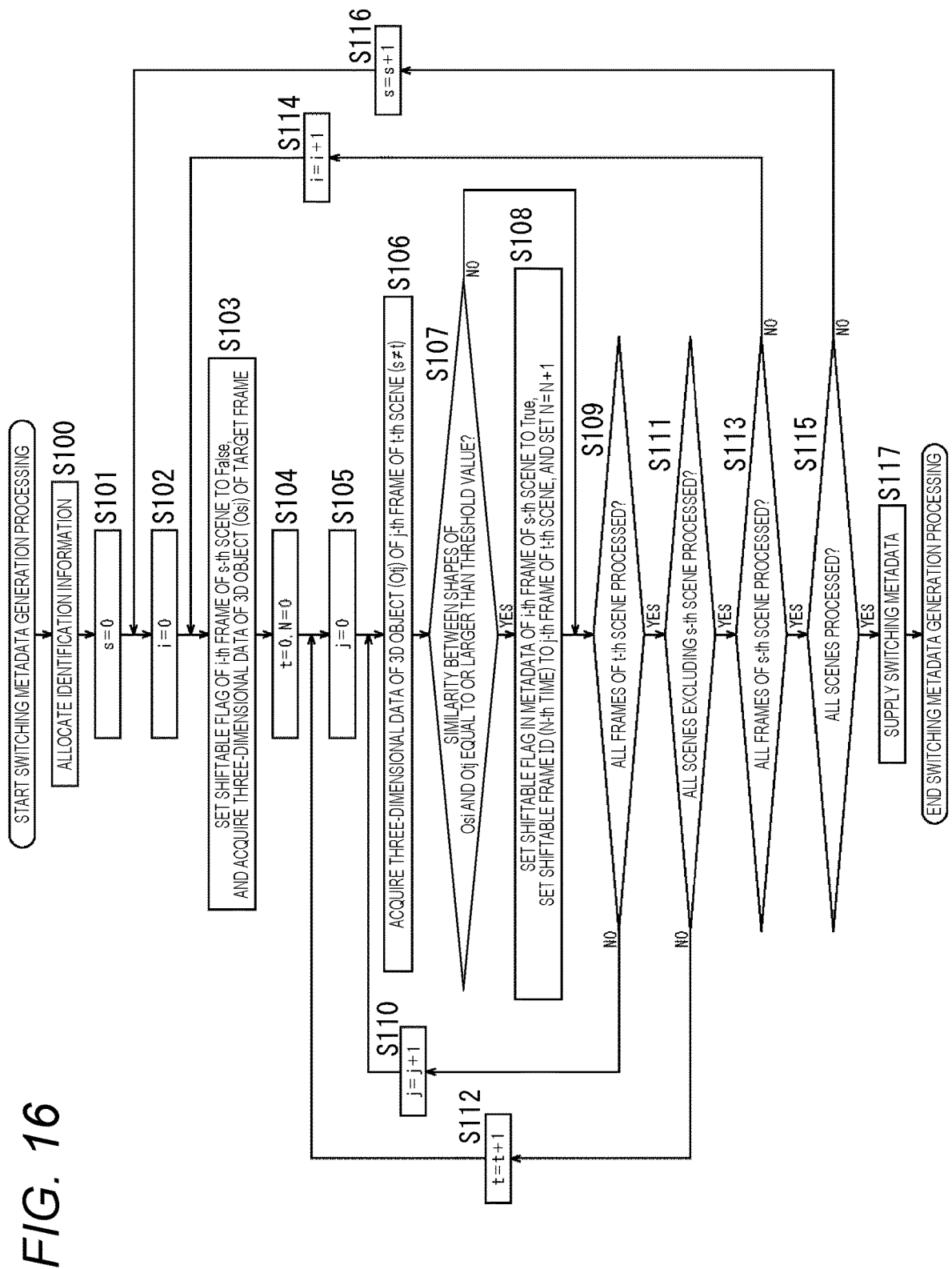
FIG. 16 is a flowchart describing switching metadata generation processing in FIG. 15.

Next, an example of a flow of the switching metadata generation processing executed in Step S85 of FIG. 15 will be described with reference to the flowchart illustrated in FIG. 16.

If the switching metadata generation processing is started, in Step S100, on the basis of the reproduction information and the scene data that are supplied from the 3D model generation unit 112, the switching metadata generation unit 111 allocates a scene ID, a frame ID in a scene, and a global frame ID, which serve as identification information, to each frame in each scene.

In Step S101, the switching metadata generation unit 111 sets zero as a variable s indicating each scene ID.

In Step S102, the switching metadata generation unit 111 sets zero as a variable i indicating the frame number of each scene.

In Step S103, on the basis of the reproduction information and the scene data that are supplied from the 3D model generation unit 112, the switching metadata generation unit 111 sets a shiftable flag of an i-th frame of an s-th scene to False.

Furthermore, the switching metadata generation unit 111 sets the i-th frame of the s-th scene as a comparison source target frame serving as a comparison source for calculating a similarity, and acquires data of a 3D object (hereinafter, represented with "Osi") of a subject in the comparison source target frame.

In Step S104, on the basis of the reproduction information and the scene data that are supplied from the 3D model generation unit 112, the switching metadata generation unit 111 sets zero as a variable t indicating a target scene serving as a comparison destination for calculating a similarity.

Furthermore, the switching metadata generation unit 111 sets zero as a variable N indicating the number of viewing experiences of a viewer.

In Step S105, on the basis of the reproduction information and the scene data that are supplied from the 3D model generation unit 112, the switching metadata generation unit 111 sets zero as a variable j indicating a target frame serving as a comparison destination for calculating a similarity.

In Step S106, on the basis of the reproduction information and the scene data that are supplied from the 3D model generation unit 112, the switching metadata generation unit 111 sets a j-th frame of a t-th scene as a comparison destination target frame serving as a comparison destination for calculating a similarity, and acquires data of a 3D object (hereinafter, represented with "Otj") of the subject in the comparison destination target frame.

In Step S107, the switching metadata generation unit 111 determines whether or not a similarity between the shapes of the 3D object Osi acquired in Step S103, and the 3D object Otj acquired in Step S106 is equal to or larger than a threshold value.

In a case where it is determined in Step S107 that the similarity between the shapes of the 3D object Osi and the 3D object Otj is equal to or larger than the threshold value, the processing proceeds to Step S108.

In Step S108, the switching metadata generation unit 111 sets a shiftable flag of the i-th frame of the s-th scene to True. Furthermore, the switching metadata generation unit 111 sets, as a shiftable frame ID (N-th time), a global frame ID indicating the j-th frame of the t-th scene, and sets N+1 as the variable N indicating the number of viewing experiences of the viewer.

In other words, a shiftable flag of a comparison source frame for calculating a similarity is set to True, and a global frame ID of a comparison destination frame as set as a shiftable frame ID (N-th time).

Note that in a case where a sub scene serving as a switching destination is not set in accordance with the number of viewing experiences, that is to say, in a case where the sub scene is fixed, one remains to be set as the variable N indicating the number of viewing experiences.

In a case where it is determined in Step S107 that a similarity between the shapes of the 3D object Osi and the 3D object Otj is smaller than the threshold value, the processing in Step S108 is skipped.

In Step S109, the switching metadata generation unit 111 determines whether or not all frames of the t-th scene have been processed. In a case where it is determined in Step S109 that all frames have not been processed, that is to say, an unprocessed frame exists, the processing proceeds to Step S110.

In Step S110, the switching metadata generation unit 111 sets j+1 as a variable j. After that, the processing returns to Step S106, and the processing in Step S106 and subsequent steps is repeated for the changed comparison destination target frame.

On the other hand, in a case where it is determined in Step S109 that all frames of the t-th scene have been processed, the processing proceeds to Step S111.

In Step S111, the switching metadata generation unit 111 determines whether or not all scenes excluding the s-th scene have been processed. In a case where it is determined in Step S111 that all scenes have not been processed, that is to say, an unprocessed scene exists, the processing proceeds to Step S112.

In Step S112, the switching metadata generation unit 111 sets t+1 as a variable t. After that, the processing returns to Step S105, and the processing in Step S105 and subsequent steps is repeated for the changed targeted scene.

On the other hand, in a case where it is determined in Step S111 that all scenes excluding the s-th scene have been processed, the processing proceeds to Step S113.

In Step S113, the switching metadata generation unit 111 determines whether or not all frames of the s-th scene have been processed. In a case where it is determined that all frames have not been processed, that is to say, an unprocessed frame exists, the processing proceeds to Step S114.

In Step S114, the switching metadata generation unit 111 sets i+1 as a variable i. After that, the processing returns to Step S103, and the processing in Step S103 and subsequent steps is repeated for the changed comparison source target frame.

On the other hand, in a case where it is determined in Step S113 that all frames of the s-th scene have been processed, the processing proceeds to Step S115.

In Step S115, the switching metadata generation unit 111 determines whether or not all scenes have been processed. In a case where it is determined in Step S115 that all scenes have not been processed, that is to say, an unprocessed scene exists, the processing proceeds to Step S116.

In Step S116, the switching metadata generation unit 111 sets s 1 as a variable s. After that, the processing returns to Step S102, and the processing in Step S102 and subsequent steps is repeated for the changed targeted scene.

On the other hand, in a case where it is determined in Step S115 that all scenes have been processed, the processing proceeds to Step S117.

In Step S117, the switching metadata generation unit 111 supplies the switching metadata generated as described above, to the 3D model generation unit 112. If the switching metadata is supplied, the switching metadata generation processing ends, and the processing returns to Step S85 of FIG. 15.

(3D Model Data Reproduction Processing of Video Reproduction Apparatus)

processing performed by the video reproduction apparatus 102.

Figure 17:
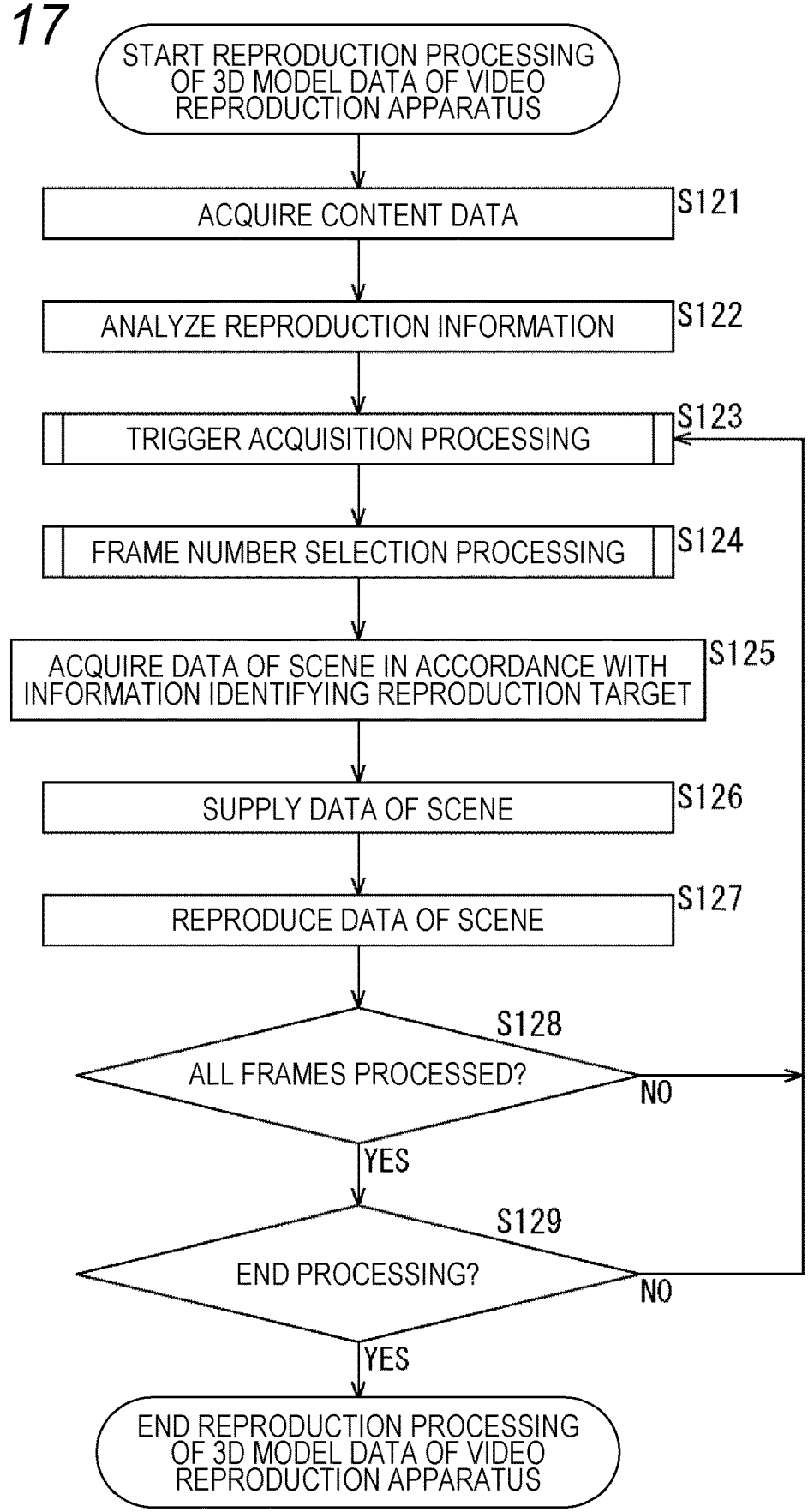
FIG. 17 is a flowchart describing processing performed by a video reproduction apparatus 102 in FIG. 14.

The processing illustrated in FIG. 17 is processing basically similar to the processing described with reference to FIG. 8.

In Step S121 of FIG. 17, the acquisition unit 21 of the video reproduction apparatus 102 acquires the content data supplied from the 3D model generation unit 112 of the video generation apparatus 101.

In Step S122, the acquisition unit 21 analyzes the reproduction information included in the acquired content data.

In Step S123, the trigger acquisition processing unit 22 performs trigger acquisition processing. In the trigger acquisition processing, on the basis of the content data supplied from the acquisition unit 21, and a state of the viewer, trigger information indicating whether or not to request the switching of a reproduction target to a sub scene is acquired. The details of the trigger acquisition processing will be described later with reference to the flowchart illustrated in FIG. 18.

In Step S124, the frame number selection unit 121 performs frame number selection processing. In the flame number selection processing, on the basis of the trigger information supplied from the trigger acquisition processing unit 22, the reproduction information included in the content data supplied from the acquisition unit 21, and the switching metadata, a reproduction target scene and a reproduction target frame number in the scene are determined. The details of the frame number selection processing will be described later with reference to the flowchart illustrated in FIG. 19.

In Step S125, the switching processing unit 25 supplies the information identifying a reproduction target that is supplied from the frame number selection unit 121, to the acquisition unit 21. In accordance with the information identifying a reproduction target that has been supplied from the switching processing unit 25, the acquisition unit 21 supplies data of the reproduction target scene to the switching processing unit 25.

In Step S126, the switching processing unit 25 supplies the date of the scene that has been supplied from the acquisition unit 21 in Step S125, to the reproduction unit 26.

In Step S127, the reproduction unit 26 renders a 3D object of a subject on the basis of the data of the scene that is supplied from the switching processing unit 25. On the basis of a rendering result, the display of the 3D object is performed on the display apparatus 3.

In Step S128, the switching processing unit 25 determines whether or not all frames of the reproduction target scene have been processed. In a case where it is determined that an unprocessed frame exists, the processing returns to Step S123, and the processing in Step S123 and subsequent steps is repeated.

On the other hand, in a case where it is determined in Step S128 that all frames of the reproduction target scene have been processed, the processing proceeds to Step S129.

In Step S129, whether or not to end the reproduction processing is determined. In a case where it is determined that the reproduction processing is not to be ended, the processing returns to Step S123, and the processing in Step S123 and subsequent steps is repeated.

On the other hand, in a case where it is determined in Step S129 that the reproduction processing is to be ended, the reproduction processing of the video reproduction apparatus 102 ends.

(Trigger Acquisition Processing)

Figure 18:
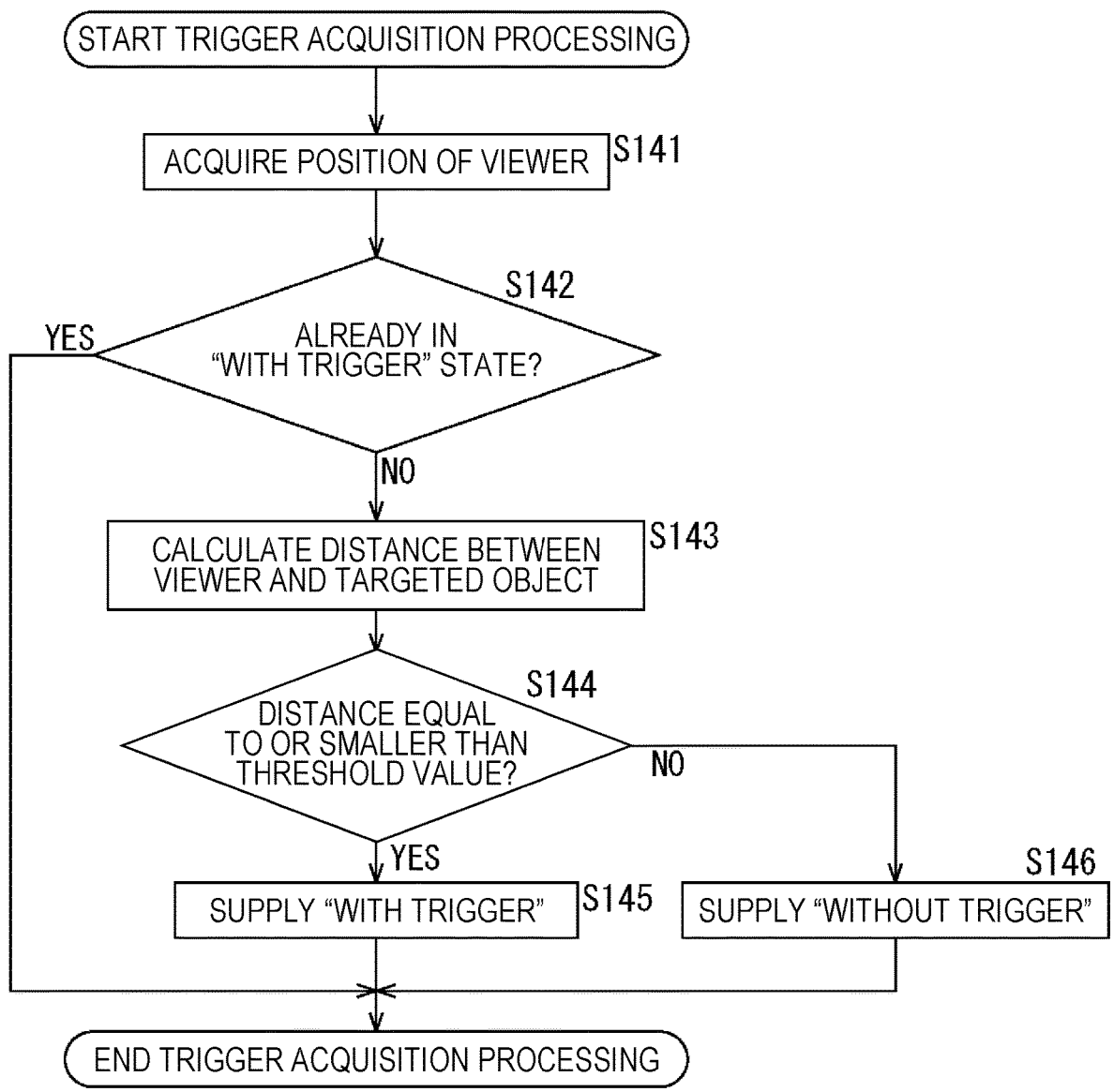
FIG. 18 is a flowchart describing trigger acquisition processing in FIG. 17.

Next, an example of a flow of the trigger acquisition processing executed in Step S123 of FIG. 17 will be described with reference to the flowchart illustrated in FIG. 18.

As described above, after trigger information requesting the switching of a video is acquired, the reproduction of the same scene is continued up to a frame set to be switchable to another frame (frame having shiftable flag set to True). The processing illustrated in FIG. 18 is processing similar to the processing illustrated in FIG. 9 except that processing of repeating the output of trigger information requesting the switching of a video, until a frame set to be switchable to another frame becomes a reproduction target is added.

If the trigger acquisition processing is started, in Step S141, the trigger acquisition processing unit 22 acquires viewing position information from the viewpoint position acquisition unit 23.

In Step S142, the trigger acquisition processing unit 22 determines whether or not lastly-supplied trigger information is already in a state of "with trigger" indicating a request for switching to a sub scene.

In a case where it is determined in Step S142 that the trigger information is not in the state of "with trigger", the processing proceeds to Step S143.

In Step S143, the trigger acquisition processing unit 22 acquires data of a scene that is supplied by the acquisition unit 21 to the switching processing unit 25. On the basis of the acquired data, the trigger acquisition processing unit 22 calculates a distance between a position of a viewer within a viewing space and a targeted object.

In Step S144, the trigger acquisition processing unit. 22 determines whether or not the distance between the position of the viewer and the targeted object is equal to or smaller than a predefined threshold value.

In a case where it is determined in Step S144 that the distance between the viewing position of the viewer and the targeted object is equal to or smaller than the threshold value, the processing proceeds to Step S145.

In Step S145, on the basis of the determination result made in the processing in Step S144, the trigger acquisition processing unit 22 generates trigger information indicating "with trigger" for requesting the switching to a sub scene, and supplies the generated trigger information to the frame number selection unit 121.

On the other hand, in a case where it is determined in Step S144 that the distance between the viewing position of the viewer and the targeted object is larger than the threshold value, the processing proceeds to Step S146.

In Step S146, on the basis of the determination result made in the processing in Step S144, the trigger acquisition processing unit 22 generates trigger information indicating "without trigger" for not requesting the switching to a sub scene, and supplies the generated trigger information to the frame number selection unit 121.

If trigger information is supplied in the processing in Step S145 or S146, the trigger acquisition processing ends, and the processing returns to Step S123 of FIG. 17. In a case where it is determined in Step S142 that the trigger information is in the state of "with trigger", the trigger acquisition processing similarly ends.

(Frame Number Selection Processing)

Next, an example of a flow of the frame number selection processing executed in Step S124 of FIG. 17 will be described with reference to the flowchart illustrated in FIG. 19.

Figure 19:
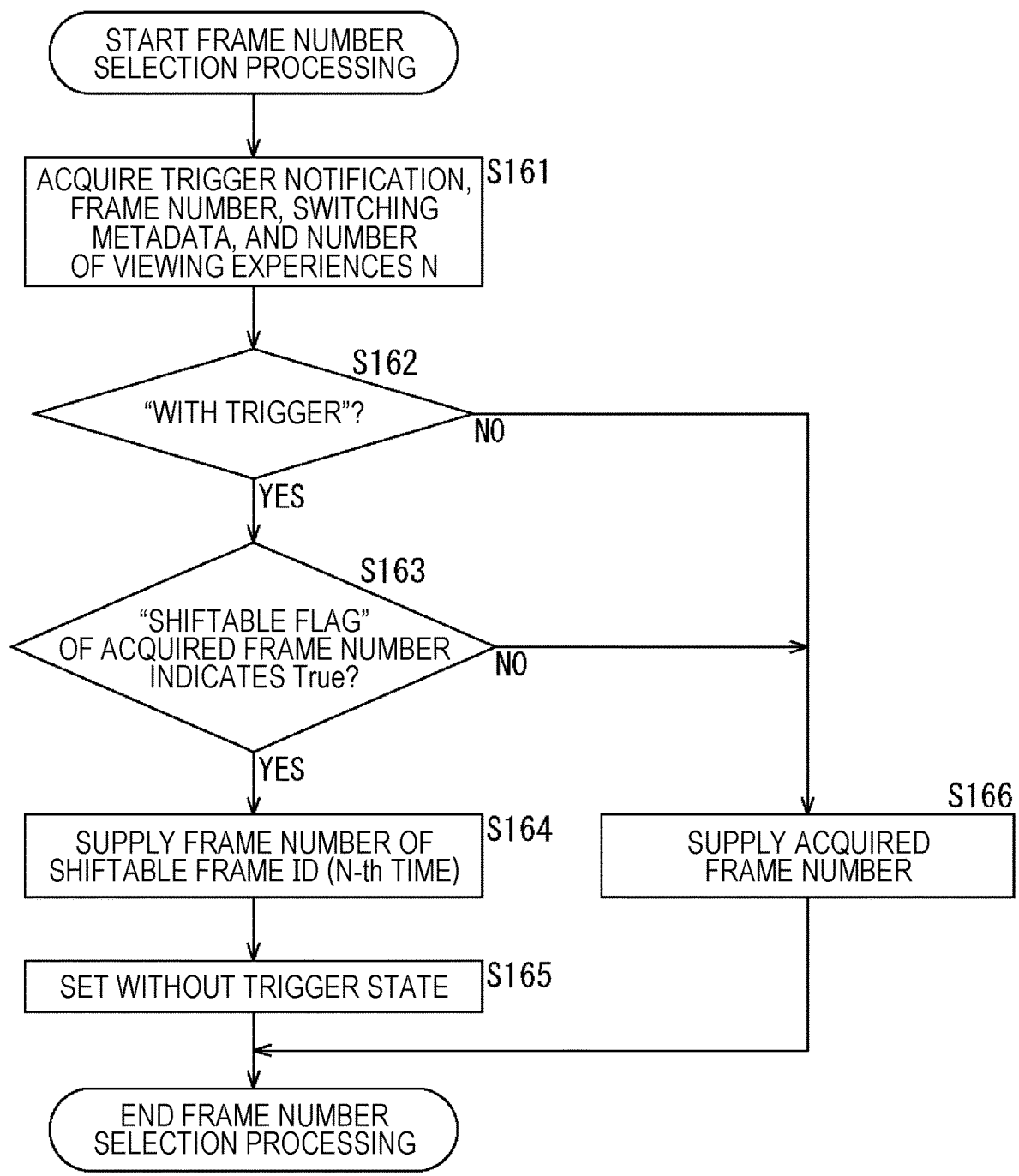
FIG. 19 is a flowchart describing frame number selection processing in FIG. 17.

The processing illustrated in FIG. 19 is different from the processing described with reference to FIG. 10 in that the switching of a scene is performed on the basis of switching metadata in place of reproduction information.

If the frame number selection processing is started, in Step S161, the frame number selection unit 121 acquires the trigger information supplied from the trigger acquisition processing unit 22, information indicating the current reproduction position that is supplied from the acquisition unit 21, the switching metadata, and the number of viewing experiences.

The frame number selection unit 121 acquires a frame number of a reproduction target frame using the information indicating the current reproduction position, and the switching metadata.

In Step S162, the frame number selection unit 121 determines whether or not the trigger information acquired in the processing in Step S160 includes information indicating "with trigger" for requesting the switching to a sub scene.

In a case where it is determined in Step S162 that the trigger information acquired in Step S161 includes information indicating "with trigger", the processing proceeds to Step S163.

In Step S163, on the basis of the switching metadata, the frame number selection unit 121 determines whether or not a shiftable flag in the switching metadata corresponding to the frame number acquired in Step S160 indicates True.

In a case where it is determined in Step S163 that the shiftable flag indicates True, the processing proceeds to Step S164.

In Step S164, on the basis of the number of viewing experiences acquired in Step S161, the frame number selection unit 121 selects a corresponding shiftable frame ID in the switching metadata. The frame number selection unit 121 acquires a global frame ID serving as information identifying a reproduction target, from the selected shiftable frame ID, and supplies the global frame ID to the switching processing unit 25.

In Step S165, the frame number selection unit 121 supplies, to the trigger acquisition processing unit 22, information instructing the setting of trigger information indicating "with trigger", to be changed to "without trigger". In the trigger acquisition processing unit 22, on the basis of the information supplied here, content of trigger information to be output to the frame number selection unit 121 is switched.

On the other hand, in a case where it is determined in Step S162 that information indicating "with trigger" is not included, or in a case where it is determined in Step S163 that a shiftable flag indicates not True but False, the processing proceeds to Step S166.

In Step S166, the frame number selection unit 121 supplies the reproduction target frame number acquired in Step S161, to the switching processing unit 25 as information identifying a reproduction target.

If information identifying a reproduction target is supplied to the switching processing unit 25 in the processing in Step S165 or S166, the frame number selection processing ends, and the processing returns to Step S124 of FIG. 17.

By the above-described processing, because a reproduction target is switched to a frame including a 3D object performing a similar operation, it is possible to switch between frames of scenes representing different operations, more seamlessly than the first embodiment, and prevent as immersive feeling of a viewer from being impaired.

Third Embodiment

Next, a third embodiment will be described.

In the first embodiment, on the basis of trigger information and reproduction information, a reaction of a 3D object of a subject can be changed in accordance with the state of a viewer.

Nevertheless, in scenes representing different series of operations, a reaction of a 3D object sometimes becomes a reaction undesired by a viewer. For example, in a case where a 3D object makes a reaction of facing a direction different from the direction of a viewer, the 3D object looks away from the viewer, and such a reaction can be said to be a reaction undesired by the viewer. This might provide a feeling of strangeness to the viewer and impair an immersive feeling of the viewer.

In view of the foregoing, is the third embodiment, line-of-sight information indicating a line-of-sight direction of a 3D object is provided to a video reproduction apparatus side. In a video reproduction apparatus, is switching a scene, a scene including a 3D object that makes a reaction considered to be desired by a viewer is selected as a switching destination scene using the line-of-sight information provided from a video generation apparatus, and the switching of a scene is performed.

With this configuration, it is possible to provide a 3D object performing an operation of looking at a viewer, while seamlessly switching between scenes representing different operations, in accordance with the state of the viewer, and prevent an immersive feeling of the viewer from being impaired.

(Overview of Operation in Third Embodiment)

Figure 20:
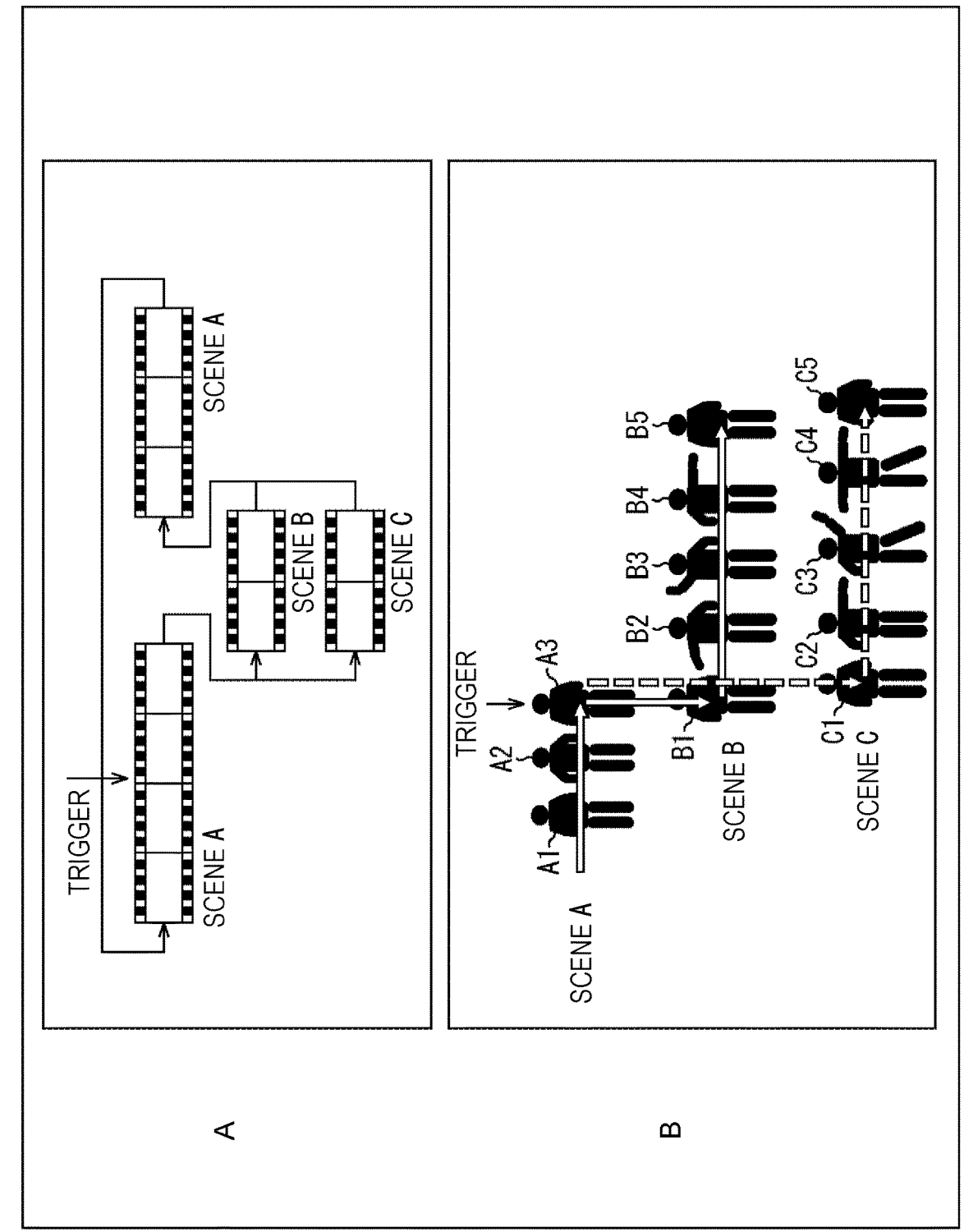
FIG. 20 is a diagram describing an overview of a switching operation example according to a third embodiment of the present disclosure.

FIG. 20 is a diagram describing an overview of an operation example of switching scenes according to a third embodiment of the present disclosure.

As illustrated in "A" of FIG. 20, for example, content includes three scenes corresponding to the scene A serving as a main scene, and the scenes B and C serving as sub scenes.

If trigger information requesting the switching of a video is acquired in a certain frame of the scene A being reproduced by the video reproduction apparatus, the video reproduction apparatus determines an appropriate scene from among the other scenes as a switching destination scene.

In the example illustrated in "A" of FIG. 20, the video reproduction apparatus determines which scene of the scene B or the scene C is appropriate for the viewer as a switching destination scene, on the basis of line-of-sight information and viewpoint position information.

After that, the video reproduction apparatus switches a scene to be reproduced, to the scene determined from the scene B or the scene C on the basis of the line-of-sight information and the viewpoint position information determined.

After switching a scene to be reproduced, the video reproduction apparatus performs the reproduction of the switching destination scene. If the reproduction of the switching destination scene ends, the video reproduction apparatus switches a frame to a frame of a predefined scene, and continues reproduction.

For example, in a case of switching a scene to be reproduced, to the scene B, the video reproduction apparatus performs the reproduction of the scene B. If the reproduction of the scene B ends, the video reproduction apparatus switches to a frame of the scene A that is a predefined scene, and subsequently, continues the reproduction of the scene A.

The switching processing of a scene will be specifically described.

As indicated by a down-pointing arrow illustrated in "B" of FIG. 20, for example, it is assumed that trigger information requesting the switching of a video is acquired in the frame A3 of the scene A. In this case, upon acquiring the trigger information, the video reproduction apparatus determines a scene appropriate as a scene to be reproduced, from the scene B and the scene C.

Specifically, on the basis of line-of-sight information associated with each frame of each scene, and viewpoint position information of a viewer, the video reproduction apparatus determines which frame of the scene B or the scene C is appropriate as a switching destination scene and a frame in the scene.

For example, in a case where it is determined that the frame B1 of the scene B is appropriate, the video reproduction apparatus switches a scene to be reproduced, to the frame B1 of the scene B as indicated by an outlined white arrow. Furthermore, in a case where it is determined that the frame C1 of the scene C is appropriate, the video reproduction apparatus switches a scene to be reproduced, to the frame C1 of the scene C as indicated by an outlined white broken-line arrow.

Figure 21:
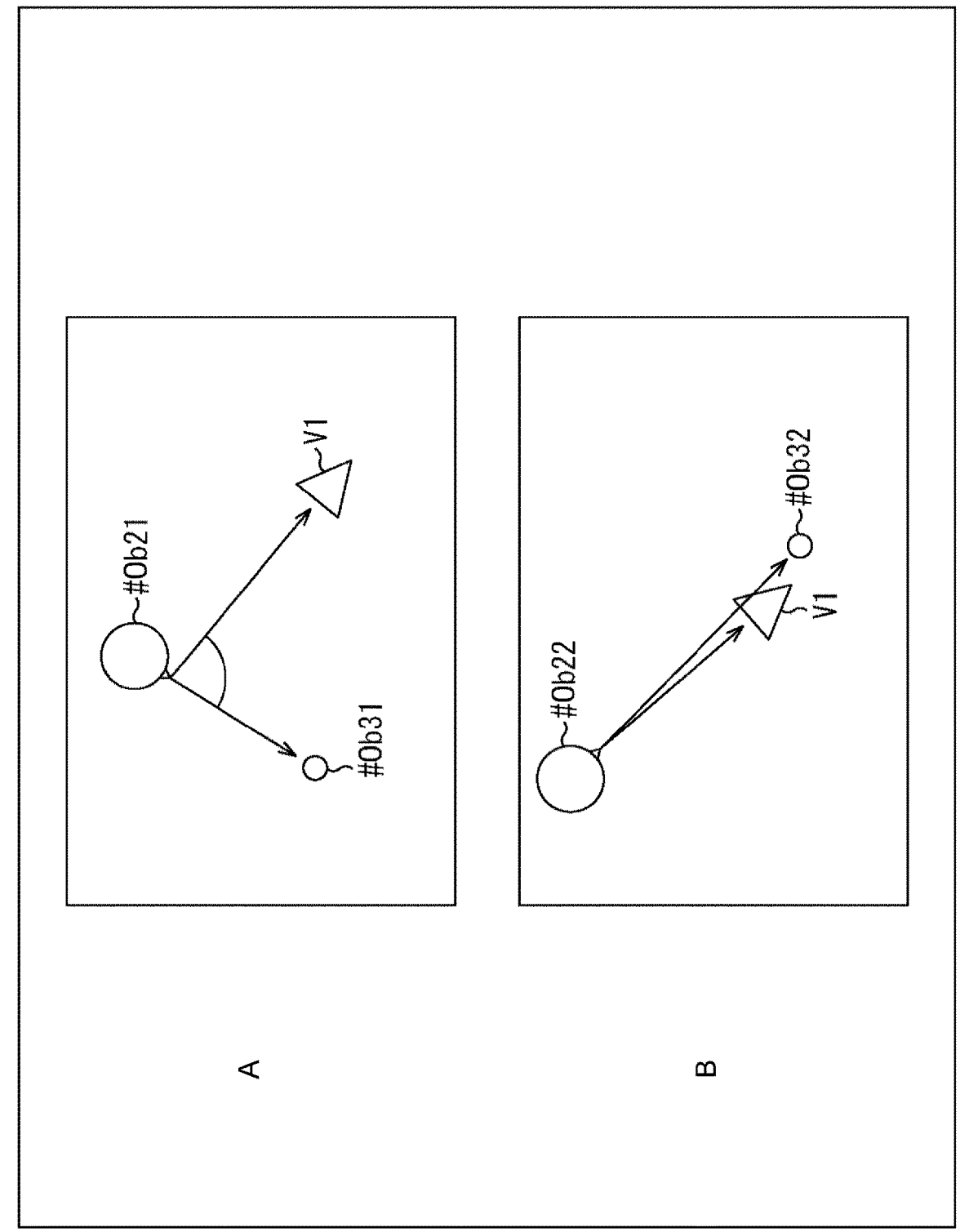
FIG. 21 is a diagram describing a 3D object and a line-of-sight vector of a viewer.

FIG. 21 is a diagram describing an example of a method of obtaining a line-of-sight direction for each frame of each scene.

As illustrated in "A" of FIG. 21, a line-of-sight vector of an object that indicates a line-of-sight direction of a 3D object #Ob21 of a subject in a certain frame of a certain scene is calculated from a difference between a position (Ox, Oy, Oz) in a space of the 3D object #Ob21 of the subject, and a position (Gx, Gy, Gz) in the space of a 3D object #Ob31 of an observation target object being observed by the 3D object #Ob21 of the subject.

As illustrated in "A" of FIG. 21, in a case where a viewer views the 3D object #Ob21 of the subject from a virtual viewing position V1 (Vx, Vy, Vz) in a viewing space, a line-of-sight vector of the viewer that indicates a line-of-sight direction of the viewer is calculated from a difference between the virtual viewing position V1 and the position (Ox, Oy, Oz) in the space of the 3D object #Ob21 of the subject.

In a case where a viewing line-of-sight angle being an angle formed between a line-of-sight vector of an object and a line-of-sight vector of a viewer is large, it can be determined that a 3D object of a subject is not looking toward the direction of the viewer in a corresponding frame of a corresponding scene. Line-of-sight information indicating a line-of-sight direction of a 3D object that is to be used for such determination is provided to the video reproduction apparatus.

From the above-described points, as illustrated in "B" of FIG. 21, in the video reproduction apparatus, it becomes possible to identify a frame of a scene in which a viewing line-of-sight angle becomes small. In the video reproduction apparatus, a frame of a scene in which a viewing line-of-sight angle becomes small is a selected as a switching destination frame.

(Configuration Example of Third Embodiment)

Figure 22:
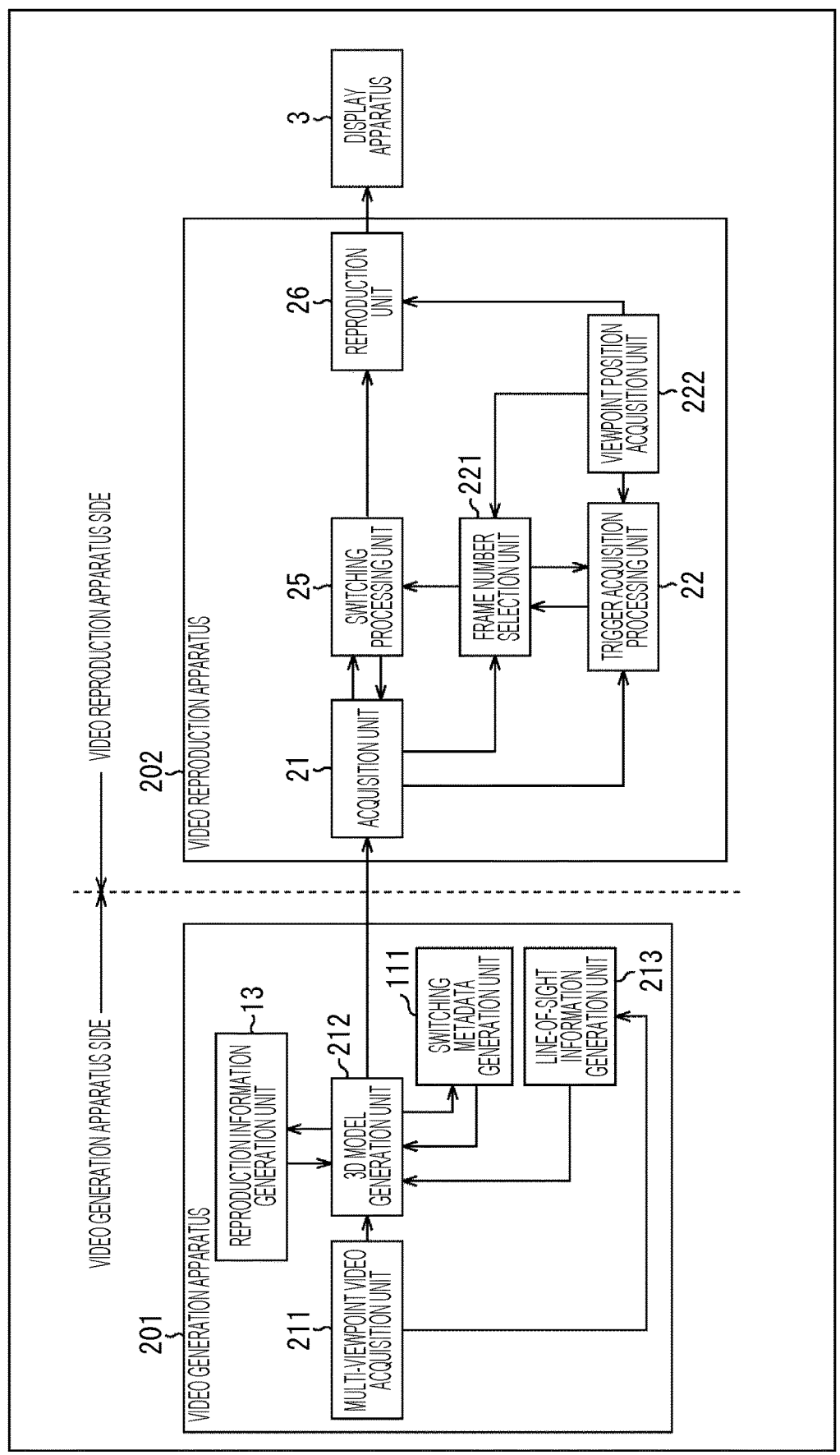
FIG. 22 is a block diagram illustrating a configuration example according to the third embodiment of the present disclosure.

FIG. 22 is a block diagram illustrating one configuration example according to the third embodiment of the present disclosure.

Among the configurations illustrated in FIG. 22, the same configurations as illustrated in FIG. 14 are assigned the same reference numerals. The redundant descriptions will be appropriately omitted.

(Description about Configuration of Video Generation Apparatus)

The configuration of a video generation apparatus 201 illustrated in FIG. 22 is different from the configuration of the video generation apparatus 101 illustrated in FIG. 14 in that a multi-viewpoint video acquisition unit 211 and a 3D model generation unit 212 are provided in place of the multi-viewpoint video acquisition unit 11 and the 3D model generation unit 12, and a line-of-sight information generation unit 213 is newly provided.

The multi-viewpoint video acquisition unit 211 of the video generation apparatus 201 in FIG. 22 acquires information regarding a subject (for example, captured 2D video, distance information, and camera parameter) from a plurality of imaging apparatuses, for example, and supplies the information to the 3D model generation unit 212 and the line-of-sight information generation unit 213.

The 3D model generation unit 212 performs modeling using information regarding a subject that is supplied from the multi-viewpoint video acquisition unit 211, and line-of-sight information supplied from the line-of-sight information generation unit 213, and generates a 3D object of a subject that includes line-of-sight information.

Furthermore, the 3D model generation unit 212 generates a scene including a 3D object of a subject that includes line-of-sight information for each frame. For example, a main scene and a sub scene are generated. The 3D model generation unit 212 supplies data of the generated scenes to the reproduction information generation unit 13.

The 3D model generation unit 212 generates content data from reproduction information supplied from the reproduction information generation unit 13, and data of a scene including line-of-sight information supplied from the line-of-sight information generation unit 213 that is generated by the 3D model generation unit 212, and supplies the generated content data to the video reproduction apparatus 202.

The line-of-sight information generation unit 213 acquires the information regarding the subject that has been supplied from the multi-viewpoint video acquisition unit 211. A plurality of 2D videos obtained by simultaneously capturing images of the same subject by the respective imaging apparatuses, for example, is supplied from the multi-viewpoint video acquisition unit 211.

The line-of-sight information generation unit 213 analyzes, for each frame, whether or not both of a subject and an observation target object are detected from a video frame of each 2D video. The line-of-sight information generation unit 213 selects, as a line-of-sight information generation frame, a video frame from which both of a subject and an observation target object are detected.

A line-of-sight information generation frame selected from each 2D video is selected in association with a frame number in the corresponding 2D video. For example, a line-of-sight information generation frame is selected from a 2D video captured by the imaging apparatus 1-1, and a line-of-sight information generation frame is selected from a 2D video captured by the imaging apparatus 1-2.

In a case where the number of line-of-sight information generation frames associated with the same frame number is equal to or larger than two (there are two or more line-of-sight information generation frames associated with the same frame number), the line-of-sight information generation unit 213 acquires the line-of-sight information generation frames in the frame number.

The line-of-sight information generation unit 213 calculates the position of a face of a subject and the position of an observation target object from a camera parameter supplied from the multi-viewpoint video acquisition unit 211, and each of the acquired line-of-sight information generation frames.

Using the calculated position of the face of the subject and the position of the observation target object, the line-of-sight information generation unit 213 calculates the position of the face of the subject in a 3D space and the position of the observation target object as 3D coordinates.

As a method of calculating a position in a 3D space, for example, there is a method of calculating the position by projecting each line-of-sight information generation frame onto a 3D space, and performing triangulation. In a case where there are two or more (a plurality of) video frames each including both of a subject and an observation target object, as frames of the same time, by using these video frames as line-of-sight information generation frames, it becomes possible to calculate the position of a face of a subject and the position of an observation target object using a method such as triangulation.

The line-of-sight information generation unit 213 calculates a line-of-sight vector of the subject from the calculated position of the face of the subject and the position of the observation target object, and generates a line-of-sight availability flag indicating that the corresponding frame is a frame including information regarding a line-of-sight vector of the subject.

The line-of-sight information generation unit 213 supplies the position of the face of the subject in the 3D space, information regarding the line-of-sight vector of the subject, and the line-of-sight availability flag to the 3D model generation unit 212 as line-of-sight information.

(Description about Configuration of Video Reproduction Apparatus)

The configuration of the video reproduction apparatus 202 illustrated in FIG. 22 is different from the video reproduction apparatus 102 illustrated in FIG. 14 in that a frame number selection unit 221 and the viewpoint position acquisition unit 222 are provided in place of the frame number selection unit 121 and the viewpoint position acquisition unit 23.

The frame number selection unit 221 of the video reproduction apparatus 202 acquires information indicating the current reproduction position, switching metadata, and line-of-sight information that are supplied from the acquisition unit 21. Furthermore, the frame number selection unit 221 acquires trigger information supplied from the trigger acquisition processing unit 22, and viewpoint position information supplied from the viewpoint position acquisition unit 222.

The frame number selection unit 221 determines a reproduction target scene, and a frame number of a reproduction target frame in the scene, using information indicating the current reproduction position that is supplied from the acquisition unit 21, the switching metadata, the line-of-sight information, and the viewpoint position information supplied from the viewpoint position acquisition unit 222, and supplies the information identifying a reproduction target, to the switching processing unit 25.

After supplying the information identifying a reproduction target, to the switching processing unit 25, the frame number selection unit 221 supplies, to the trigger acquisition processing unit 22, information for instructing trigger information to be set to information including content not requesting the switching of a scene.

The viewpoint position acquisition unit 222 acquires the viewpoint position information, and supplies the viewpoint position information to the trigger acquisition processing unit 22, the frame number selection unit 221, and the reproduction unit 26.

Next, an operation of each apparatus having the above-described configuration will be described.

(Operation of Each Apparatus in Third Embodiment)

(3D Model Data Generation Processing of Video Generation Apparatus)

Figure 23:
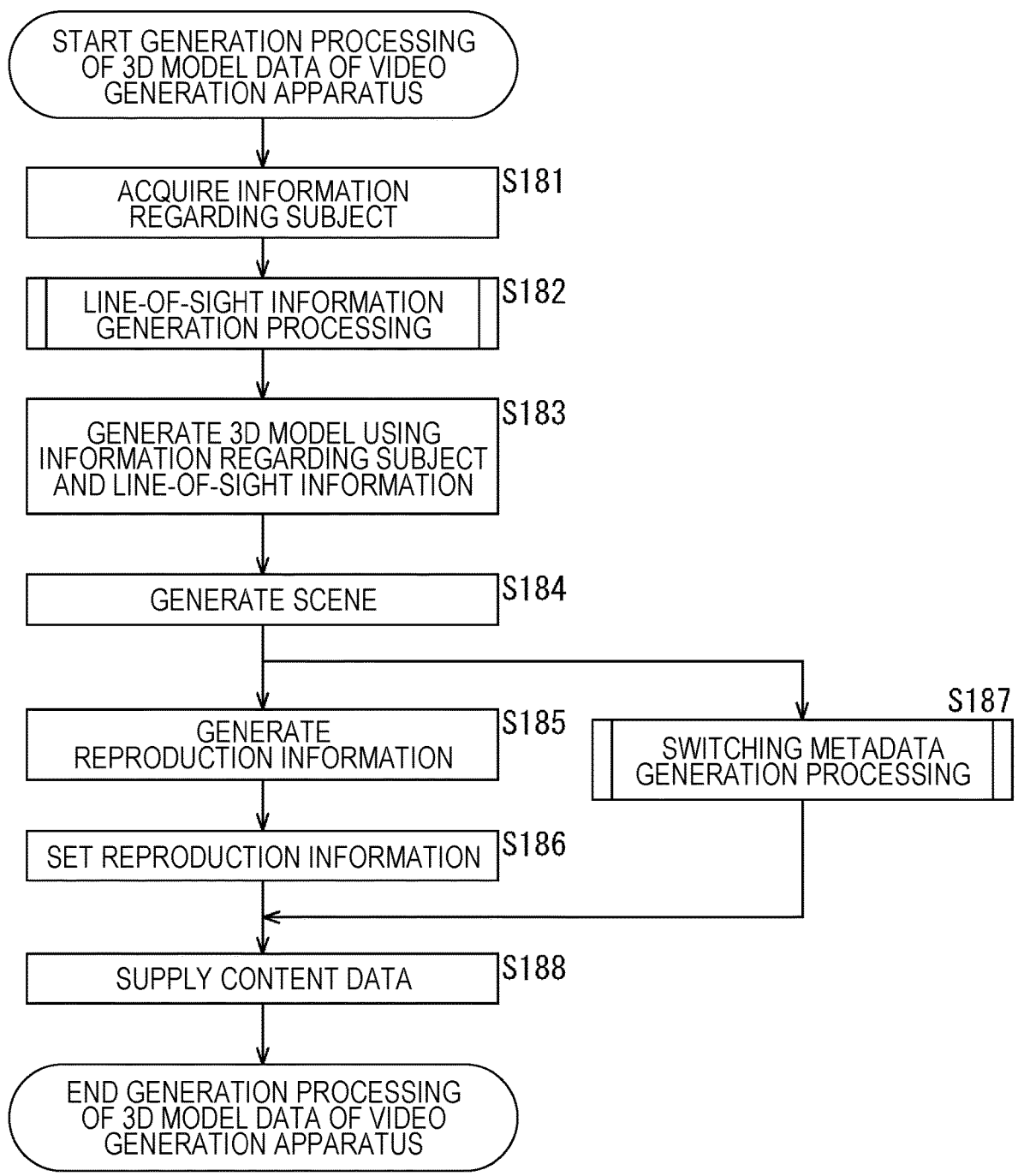
FIG. 23 is a flowchart describing processing performed by a video generation apparatus 201 in FIG. 22.

FIG. 23 is a flowchart describing generation processing performed by the video generation apparatus 201.

In Step S181 of FIG. 23, the multi-viewpoint video acquisition unit 211 of the video generation apparatus 201 acquires information regarding a subject from a plurality of imaging apparatuses, and supplies the information to the 3D model generation unit 212 and the line-of-sight information generation unit 213.

In Step S182, the line-of-sight information generation unit 213 performs line-of-sight information generation processing. By the line-of-sight information generation processing, line-of-sight information of each video frame is generated on the basis of the information regarding the subject that has been supplied from the multi-viewpoint video acquisition unit 211. The details of the line-of-sight information generation processing will be described later with reference to the flowchart illustrated in FIG. 24.

In Step S183, by 3D modeling, the 3D model generation unit 212 generates a 3D object of the subject that includes line-of-sight information, using the information regarding the subject, and the line-of-sight information generated in Step S182.

In Step S184, the 3D model generation unit 212 generates a scene using the 3D object of the subject that represents a series of motions. In a case where there is a plurality of series of motions, here, a scene corresponding to each series of motions is individually generated.

In step S185, the reproduction information generation unit 13 selects and sets a main scene or a sub scene, for example, on the basis of data of the scene supplied from the 3D model generation unit 212. The reproduction information generation unit 13 generates reproduction information defining the respective reproduction procedures of the main scene and the sub scene, and supplies the reproduction information to the 3D model generation unit 212.

In Step S186, the 3D model generation unit 212 sets the reproduction information supplied from the reproduction information generation unit 13, in data of a scene, and generates content data including the data of the scene in which the reproduction information is set.

In Step S187, the switching metadata generation unit. 111 performs generation processing of switching metadata. In the switching metadata generation processing, switching metadata is generated on the basis of data of a scene that is supplied from the 3D model generation unit 212, and reproduction information, and the switching metadata is supplied to the 3D model generation unit 212. Because the switching metadata generation processing is processing similar to the processing described with reference to FIG. 16, the detailed description of the switching metadata generation processing will be omitted.

In Step S188, the 3D model generation unit 212 stores the switching metadata generated in Step S187, into the content data generated in Step S186, and supplies the content data and the switching metadata to the video reproduction apparatus 202. After that, the generation processing of the video generation apparatus 201 ends.

(Line-of-Sight Information Generation Processing)

Figure 24:
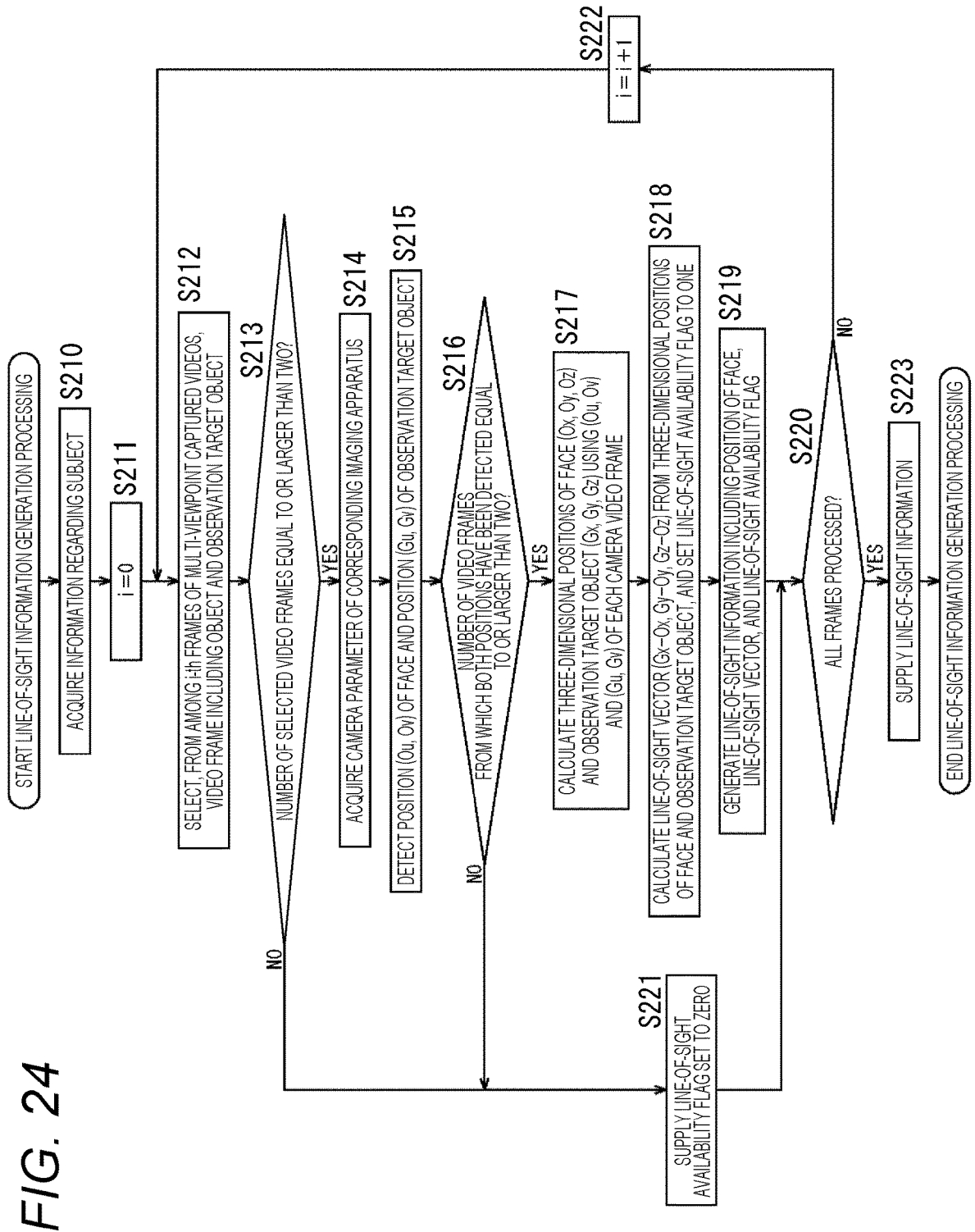
FIG. 24 is a flowchart describing line-of-sight information generation processing in FIG. 23.

Next, an example of a flow of the line-of-sight information generation processing executed in Step S182 of FIG. 23 will be described with reference to the flowchart illustrated in FIG. 24.

If the line-of-sight information generation processing is started, in Step S210, the line-of-sight information generation unit 213 acquires information regarding a subject (for example, captured 2D video, distance information, and camera parameter) supplied from the multi-viewpoint video acquisition unit 211. Here, the information regarding a subject is acquired for each imaging apparatus that captures an image of the same subject.

In Step S211, the line-of-sight information generation unit 213 sets a variable i for designating a frame number of each video frame in the 2D video acquired in Step S210, as i=0. The variable i is a variable used in common among all 2D videos acquired by the respective imaging apparatuses that capture images of the same subject.

In Step S212, the line-of-sight information generation unit 213 selects, as a line-of-sight information generation frame, a video frame including both of the subject and an observation target object, from among i-th video frames in the 2D videos of the respective imaging apparatuses that have been acquired in Step S210.

The i-th video frames to be observed here include a video frame including both of the subject and the observation target object, and a video frame including only the subject. The former video frame including both of the subject and the observation target object is selected as a line-of-sight information generation frame.

Such a line-of-sight information generation frame is selected from among the i-th video frames in the respective 2D videos captured by the plurality of imaging apparatuses.

In Step S213, the line-of-sight information generation unit 213 determines whether or not the number of selected line-of-sight information generation frames is equal to or larger than two. In a case where it is determined that the number of selected line-of-sight information generation frames is equal to or larger than two, the processing proceeds to Step S211.

In Step S214, the line-of-sight information generation unit 213 acquires a camera parameter of an imaging apparatus corresponding to each line-of-sight information generation frame, from the information regarding the subject that has been acquired in Step S210.

In Step S215, the line-of-sight information generation unit 213 detects a position. (Ou, Ov) of a face of the subject and a position (Gu, Gv) of the observation target object in each of the line-of-sight information generation frames acquired in Step S212. The detection of the positions is performed using the camera parameter as necessary.

In Step S216, the line-of-sight information generation unit 213 determines whether or not the number of line-of-sight information generation frames from which the position of the face of the subject and the position of the observation target object have been detected within the same frame is equal to or larger than two. In a case where it is determined that the number of detected line-of-sight information generation frames is equal to or larger than two, the processing proceeds to Step S217.

In Step S217, the line-of-sight information generation unit 213 calculates a position (Ox, Oy, Oz) in a 3D space of the face of the subject and a position (TX, Gy, Gz) in the 3D space of the observation target object using the position (Ou, Ov) of the face of the subject and the position (Gu, Gv) of the observation target object in each of the line-of-sight information generation frames.

In Step S218, the line-of-sight information generation unit 213 calculates a line-of-sight vector indicating a line-of-sight direction of the subject, from a difference between the position (Ox, Oy, Oz) in the 3D space of the face of the subject and the position (Gx, Gy, Gz) in the 3D space of the observation target object that have been calculated in Step S217. Then, the line-of-sight information generation unit 213 generates a line-of-sight availability flag indicating that a corresponding frame is a frame including a line-of-sight vector, and sets the line-of-sight availability flag to one.

In Step S219, the line-of-sight information generation unit 213 generates, as line-of-sight information, the position in the 3D space of the face of the subject, the line-of-sight vector, and the line-of-sight availability flag that are generated in Step S218, together with information regarding a related line-of-sight information generation frame.

In Step S220, the line-of-sight information generation unit 213 determines whether or not all video frames of each 2D video have been processed.

On the other hand, in a case where it is determined in Step S213 or S216 that the number of line-of-sight information generation frames is not equal to or larger than two, the processing proceeds to Step S221.

In Step S221, the line-of-sight information generation unit 213 sets the line-of-sight availability flag to zero.

In a case where it is determined in Step S220 that an unprocessed frame exists, the processing proceeds to Step S222.

In Step S222, the line-of-sight information generation unit 213 sets a variable i indicating a frame number of a 2D video, as i=i+1. After that, the processing returns to Step S212, and the processing in Step S212 and subsequent steps is repeated.

On the other hand, in a case where it is determined in Step S220 that the all video frames have been processed, the processing proceeds to Step S223.

In Step S223, the line-of-sight information generation unit 213 supplies all pieces of line-of-sight information to the 3D model generation unit 212, and ends the line-of-sight information generation processing. After that, the processing returns to Step S182 of FIG. 23, and the processing in Step S182 and subsequent steps is repeated.

(3D Model Data Reproduction Processing of Video Reproduction Apparatus)

A flow of the entire processing performed by the video reproduction apparatus 202 illustrated in FIG. 22 is the same as the flow of the processing described in the second embodiment with reference to FIG. 17, except that the frame number selection processing (Step S124). The redundant description will be omitted.

(Frame Number Selection Processing)

Figure 25:
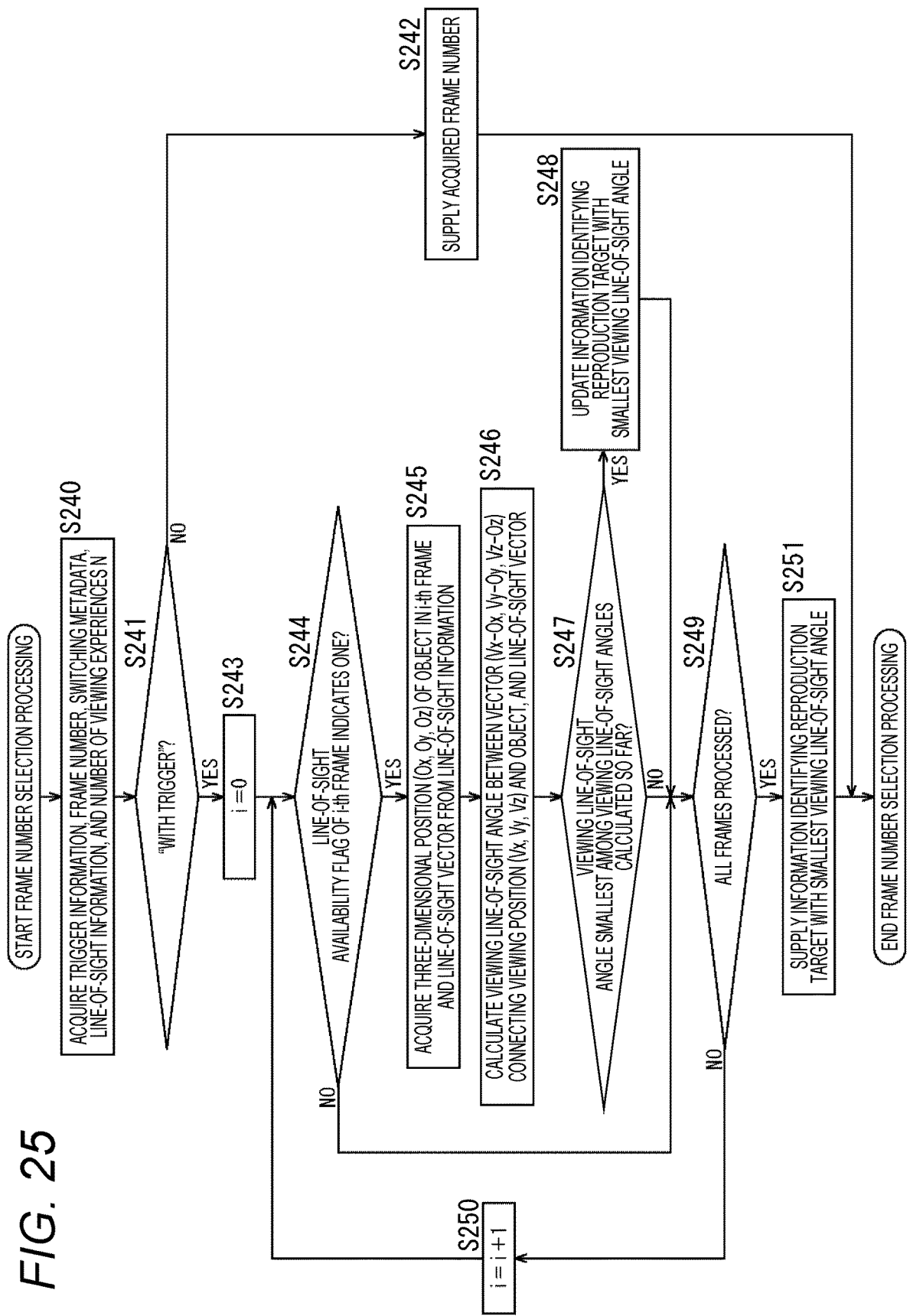
FIG. 25 is a flowchart describing frame number selection processing in FIG. 17.

Next, an example of a flow of the frame number selection processing executed in Step S124 of FIG. 17 will be described with reference to the flowchart illustrated in FIG. 25. The processing illustrated in FIG. 25 is processing performed by the video reproduction apparatus 202 illustrated in FIG. 22.

If the frame number selection processing is started, in Step S240, the frame number selection unit 221 acquires switching metadata, information indicating the current reproduction position, and line-of-sight information that are supplied from the acquisition unit 21.

Furthermore, the frame number selection unit 221 acquires trigger information supplied from the trigger acquisition processing unit 22, and viewpoint position information supplied from the viewpoint position acquisition unit 222.

In Step S241, the frame number selection unit 221 determines whether or not the trigger information acquired in the processing in Step S240 includes information indicating "with trigger" for requesting the switching to a sub scene.

In a case where it is determined in Step S241 that information indicating "with trigger" is not included, the processing proceeds to Step S242.

In Step S242, the frame number selection unit 221 supplies, to the switching processing unit 25, a reproduction target scene acquired in Step S240, and a reproduction target frame number in the scene, as information identifying a reproduction target. After that, the processing returns to Step S124 of FIG. 17, and the processing in Step S124 and subsequent steps is repeated.

On the other hand, in a case where it is determined in Step S241 that information indicating "with trigger" is included, the processing proceeds to Step S243.

In Step S243, the frame number selection unit 221 sets a variable i indicating a global frame ID for identifying frames of all scenes included in content data, as i=0, on the basis of the switching metadata acquired in Step 3240.

In Step S244, the frame number selection unit 221 determines whether or not a line-of-sight availability flag of an i-th frame identified by a global frame ID in the switching metadata indicates one, on the basis of the line-of-sight information. In a case where it is determined that the line-of-sight availability flag indicates one, the processing proceeds to Step S245.

In Step S245, the frame number selection unit 221 acquires, from the line-of-sight information acquired in Step 3240, the position (Ox, Oy, Oz) of the 3D object of the subject within a viewing space in the i-th frame identified by the global frame ID, and a line-of-sight vector.

In Step S246, the frame number selection unit 221 acquires a viewing position of a viewer from the viewpoint position information acquired in Step S240.

The frame number selection unit 221 sets a vector connecting the viewing position of the viewer and the 3D object of the subject, and calculates an angle formed by the set vector and the line-of-sight vector, as a viewing line-of-sight angle. The frame number selection unit 221 stores the calculated viewing line-of-sight angle, and information identifying a frame having the viewing line-of-sight angle.

In Step S247, the frame number selection unit 221 determines whether or not the viewing line-of-sight angle newly calculated in Step S246 is the smallest among viewing line-of-sight angles calculated and stored so far.

In a case where it is determined that the new viewing line-of-sight angle is the smallest, the processing proceeds to Step S248.

In Step S248, the frame number selection unit 221 deletes the already-stored information regarding the viewing line-of-sight angle, and stores the new viewing line-of-sight angle smaller in a value of a viewing line-of-sight angle, and information identifying a frame having the viewing line-of-sight angle.

In a case where it is determined in Step S244 that the line-of-sight availability flag does not indicate one, the above-described processing in Steps S245 to S248 is shipped.

In Step S249, the frame number selection unit 221 determines whether or not all frames have been processed in a case where it is determined in Step S249 that all frames have not been processed, the processing proceeds to Step S250.

In Step S250, the frame number selection unit 221 sets a variable i as i=i+1. After that, the processing returns to Step S244, and the processing in Step S244 and subsequent steps is repeated.

On the other hand, in a case where it is determined in Step S249 that all frames have been processed, the processing proceeds to Step S251.

In Step S251, the frame number selection unit 221 supplies, to the switching processing unit 25, the smallest viewing line-of-sight angle and a frame number of a frame having the viewing line-of-sight angle, as information identifying a reproduction target.

Note that information identifying a reproduction target may be switched in accordance with the number of viewing experiences acquired in Step S240.

After the frame number selection unit 221 supplies the information identifying a reproduction target to the switching processing unit 25, the frame number selection processing ends. After that, the processing returns to Step S124 of FIG. 17, and the processing in Step S124 and subsequent steps is repeated.

By the above-described processing, a scene including a 3D object of a subject facing the direction of a viewer is selected as a reproduction target, and the switching of a scene is performed. It therefore becomes possible to prevent the viewer from feeling a feeling of strangeness. Furthermore, it becomes possible for the viewer to obtain an immersive feeling.

<Additional Statement>

In reproducing content data, the motion of a 3D object of a subject is assumed to be switched by the switching of a scene. Alternatively, a background video of a viewing space may be switched in accordance with switching metadata in place of a 3D object of a subject.

<Computer>

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 26:
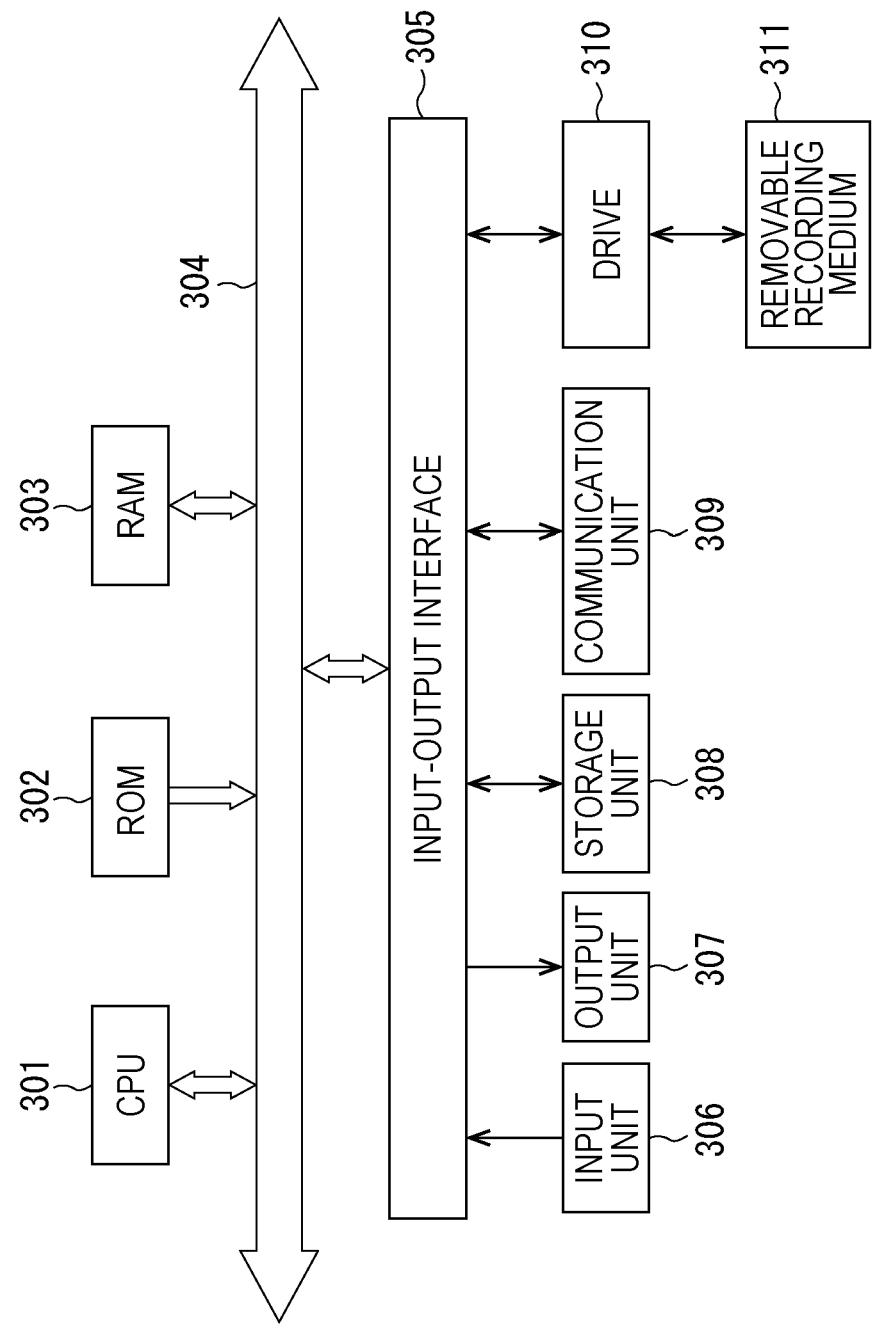
FIG. 26 is a block diagram illustrating a configuration example of hardware of a computer.

FIG. 26 is a block diagram illustrating an exemplary hardware configuration of a computer that executes the series of processes described above according to a program.

In the computer 300 illustrated in FIG. 26, a central processing unit (CPU) 301, read-only memory (ROM) 302, and random access memory (RAM) 303 are interconnected through a bus 304.

Additionally, an input/output interface 305 is also connected to the bus 304. An input unit 306, an output unit 307, a storage unit 308, a communication unit 309, and a drive 310 are connected to the input/output interface 305.

The input unit 306 includes a keyboard, a mouse, a microphone, a touch panel, an input terminal, and the like, for example. The output unit 307 includes a display, a speaker, an output terminal, and the like, for example. The storage unit 308 includes a hard disk, non-volatile memory, and the like, for example. The communication unit 309 includes a network interface, for example. The drive 310 drives a removable medium 311 such as a magnetic disk, an optical disc, a magneto-optical disc, or semiconductor memory.

In a computer configured as above, the series of processes described above are performed by having the CPU 301 load a program stored in the storage unit 308 into the RAM 303 via the input/output interface 305 and the bus 304, and execute the program, for example.

Additionally, data required for the CPU 301 to execute various processes and the like is also stored in the RAM 303 as appropriate.

The program executed by the computer (CPU 301) may be applied by being recorded onto the removable medium 311 as an instance of packaged media or the like, for example. In this case, the program may be installed in the storage unit 308 via the input/output interface 305 by inserting the removable medium 311 into the drive 310.

In addition, the program may also be provided via a wired or wireless transmission medium such as a local area network, the Internet, or digital satellite broadcasting. In this case, the program may be received by the communication unit 309 and installed in the storage unit 308.

Otherwise, the program may also be preinstalled in the ROM 302 or the storage unit 308.

<Application Target of Present Technology>

The present technology can be applied to an arbitrary image encoding/decoding method. In other words, unless otherwise a contradiction to the above-described the present technology arises, structures of various types of processing regarding image encoding/decoding can be arbitrarily determined, and the structures are not limited to the above-described examples.

Furthermore, the above description has been given of a case where the present technology is applied to an imaging apparatus, but the application of the present technology is not limited to an imaging apparatus and the present technology can be applied to an arbitrary apparatus (electronic device). For example, the present technology can also be applied to an image processing apparatus that performs image processing on a captured image obtained by high digital gain image capturing performed by another apparatus, or the like.

Furthermore, the present technology can also be executed as any configuration mounted on an apparatus included in an arbitrary apparatus or system such as, for example, a processor (for example, video processor) serving as a system large scale integration (LSI) or the like, a module (for example, video module) that uses a plurality of processors or the like, a unit (for example, video unit) that uses a plurality of modules or the like, or a set (for example, video set) obtained by further adding another function to a unit, or the like (that is, a part of configurations of the apparatus).

Moreover, the present technology can also be applied to a network system including a plurality of apparatuses. For example, the present technology can also be applied to a cloud service that provides a service related to an image (moving image), to an arbitrary terminal such as a computer, audio visual (AV) equipment, a portable information processing terminal, and an Internet of Things (IoT) device.

Note that a system, an apparatus, a processing unit, or the like to which the present technology is applied can be used in an arbitrary field such as, for example, transportation, a medical field, crime prevention, an agriculture industry, a livestock industry, a mining industry, a beauty industry, an industrial plant, home electronics, a weather field, and nature monitoring. Furthermore, the use application of the system, the apparatus, the processing unit, or the like may be any use application.

For example, the present technology can be applied to a system or a device provided for providing content for observation, or the like. Furthermore, for example, the present technology can also be applied to a system or a device provided for the purpose of transportation such as monitoring of a traffic situation and automated driving control. Moreover, for example, the present technology can also be applied to a system or a device provided for the purpose of security. Furthermore, for example, the present technology can be applied to a system or a device provided for automatically controlling a machine or the like. Moreover, for example, the present technology can also be applied to a system or a device provided for an agriculture industry or a livestock industry. Furthermore, the present technology can be applied to a system or a device that monitors a natural state of volcano, forest, ocean, or the like, wildlife plants, and the like, for example. Moreover, for example, the present technology can also be applied to a system or a device provided for the purpose of sport.

<Others>

In this specification, a system means a set of a plurality of constituent elements (e.g., devices or modules (parts)), regardless of whether or not all the constituent elements are in the same housing. Accordingly, a plurality of deices that is contained in different housings and connected via a network and one device in which a plurality of modules is contained in one housing are both systems.

Further, for example, an element described as a single device (or processing unit) may be divided and configured as a plurality of devices (or processing units). Conversely, elements described as a plurality of devices (or processing units) above may be configured collectively as a single device (or processing unit). Further, an element other than those described above may be added to the configuration of each device (or processing unit). Furthermore, a part of the configuration of a given device (or processing unit) may be included in the configuration of another device (or another processing unit) as long as the configuration or operation of the system as a whole is substantially the same.

In addition, for example, the present technology can adopt a configuration of cloud computing which performs processing by allocating and sharing one function by a plurality of devices through a network.

In addition, for example, the program described above can be executed in any device. In this case, it is sufficient if the device has a necessary function (functional block or the like) and can obtain necessary information.

For example, each step described by the above-described flowcharts can be executed by one device or executed by being allocated to a plurality of devices. Furthermore, in the case where a plurality of processes is included in one step, the plurality of processes included in this one step can be executed by one device or executed by being allocated to a plurality of devices. In other words, a plurality of processes included in one step can be executed as a plurality of steps. In contrast, processes described as a plurality of steps can also be collectively executed as one step.

Note that in a program executed by a computer, processing in steps describing the program may be executed chronologically along the order described in this specification, or may be executed concurrently, or individually at necessary timing such as when a call is made. In other words, unless otherwise a contradiction arises, the processes in the respective steps may be executed in an order different from the above-described order. Furthermore, processing in steps describing the program may be executed concurrently with processing of another program, or may be executed in combination with processing of another program.

Note that the plurality of present technologies described in this specification can be performed alone independently of each other, unless a contradiction arises. Of course, any plurality of the present technologies can be performed in combination. In one example, a part or whole of the present technology, described in any of the embodiments can be performed in combination with a part or whole of the present technology described in another embodiment. In addition, a part or whole of any of the present technologies described above can be performed in combination with another technology that is not described above.

Additionally, the present technology may also be configured as below.

(1)

A video reproduction apparatus including:

an acquisition unit configured to acquire a first 3D shape video generated from a plurality of viewpoint videos obtained by capturing images of a subject from different viewpoints, and a second 3D shape video being a video different from the first 3D shape video; and a switching processing unit configured to switch a frame to be reproduced, from a frame of the first 3D shape video to a frame of the second 3D shape video on the basis of a state of a viewer viewing the first 3D shape video.

(2)

The video reproduction apparatus according to (1), in which the switching processing unit switches a frame on the basis of a positional relationship between a viewpoint position of the viewer within a viewing space that serves as the state of the viewer, and a 3D shape of a subject in the first 3D shape video.

(3)

The video reproduction apparatus according to (2), further including a trigger acquisition processing unit configured co acquire trigger information requesting switching of a frame to be reproduced, on the basis of the positional relationship.

(4)

The video reproduction apparatus according to (3), in which the acquisition unit further acquires switching metadata including a shiftable flag indicating whether or not switching from a frame of the first 3D shape video to a frame of the second 3D shape video can be performed.

(5)

The video reproduction apparatus according to (4), in which the switching metadata is generated on the basis of a similarity between a 3D object of a subject in each frame of the first 3D shape video and a 3D object of a subject in each frame of the second 3D shape video.

(6)

The video reproduction apparatus according to (5), in which the switching processing unit switches a frame to be reproduced, from a frame of the first 3D shape video to a frame of the second 3D shape video on the basis of the switching metadata.

(7)

The video reproduction apparatus according to (6), in which, in a case where a frame of the first 3D shape video being reproduced is a frame not allowed by the switching metadata to be switched to a frame of the second 3D shape video, the switching processing unit does not perform switching from the first 3D shape video to the second 3D shape video up to a frame allowed by the switching metadata to be switched, even when the trigger information is acquired.

(8)

The video reproduction apparatus according to (7), in which the switching metadata further includes a shiftable frame ID corresponding to the number of viewing experiences.

(9)

The video reproduction apparatus according to (8), in which the acquisition unit further acquires line-of-sight information of a 3D object of a subject for each frame of the first 3D shape video and the second 3D shape video.

(10)

The video reproduction apparatus according to (9), in which the line-of-sight information includes a position of a 3D object of a subject in a 3D shape video, a line-of-sight vector, and a line-of-sight availability flag of each frame of the first 3D shape video and the second 3D shape video.

(11)

The video reproduction apparatus according to (10), in which the switching processing unit further switches a shiftable frame in accordance with the line-of-sight information and the number of viewing experiences.

(12)

The video reproduction apparatus according to any one of (1) to (11), in which the first 3D shape video is a video serving as a main of content and the second 3D shape video is a video of a specific sub scene of content.

(13)

The video reproduction apparatus according to any one of (1) to (12), in which the switching processing unit switches a background video of a viewing space in place of a 3D shape video of a subject in accordance with the switching metadata.

(14)

A reproduction method executed by a video reproduction apparatus, the reproduction method including:

acquiring a first 3D shape video generated from a plurality of viewpoint videos obtained by capturing images of a subject from different viewpoints, and a second 3D shape video being a video different from the first 3D shape video; and switching a frame to be reproduced, from a frame of the first 3D shape video to a frame of the second 3D shape video on the basis of a state of a viewer viewing the first 3D shape video.

(15)

A program for causing a computer to execute processing of:
  acquiring a first 3D shape video generated from a plurality of viewpoint videos obtained by capturing images of a subject from different viewpoints, and a second 3D shape video being a video different from the first 3D shape video; and switching a frame to be reproduced, from a frame of the first 3D shape video to a frame of the second 3D shape video on the basis of a state of a viewer viewing the first 3D shape video.

REFERENCE SIGNS LIST

1 Video generation apparatus
2 Video reproduction apparatus
3 Display apparatus
11 Multi-viewpoint video acquisition unit
12 3D model generation unit
13 Reproduction information generation unit
21 Acquisition unit
22 Trigger acquisition processing unit
24 Frame number selection unit
25 Switching processing unit
26 Reproduction unit
101 Video generation apparatus
102 Video reproduction apparatus
111 Switching metadata generation unit
112 3D model generation unit
121 Frame number selection unit
201 Video generation apparatus
202 Video reproduction apparatus
211 Multi-viewpoint video acquisition unit
212 3D model generation unit
213 Line-of-sight information generation unit
221 Frame number selection unit
222 Viewpoint position acquisition unit

The invention claimed is:

1. A video reproduction apparatus comprising:
  an acquisition unit configured to acquire a first 3D shape video generated from a plurality of viewpoint videos obtained by capturing images of a subject from different viewpoints, and a second 3D shape video being a video independent of the first 3D shape video; and
  a switching processing unit configured to switch a frame to be reproduced, from a frame of the first 3D shape video to a frame of the second 3D shape video on a basis of a state of a viewer viewing the first 3D shape video,
  wherein the switching processing unit switches the frame to be reproduced further based on a positional relationship between a viewpoint position of the viewer within a viewing space in the first 3D shape video that serves as the state of the viewer and a position of a 3D object of a subject within the viewing space in the first 3D shape video,
  wherein the position relationship includes whether or not the viewpoint position of the viewer within the viewing space in the first 3D shape video and the position of the 3D object of the subject corresponding to the frame of the first 3D shape video exists at a same position within the viewing space in the first 3D shape video at a same time, and
  wherein the acquisition unit and the switching processing unit are each implemented via at least one processor.

2. The video reproduction apparatus according to claim 1, further comprising
  a trigger acquisition processing unit configured to acquire trigger information requesting switching of a frame to be reproduced, on a basis of the positional relationship,
  wherein the trigger acquisition processing unit is implemented via at least one processor.

3. The video reproduction apparatus according to claim 2, wherein
  the acquisition unit is further configured to acquire switching metadata including a shiftable flag indicating whether or not switching from a frame of the first 3D shape video to a frame of the second 3D shape video can be performed.

4. The video reproduction apparatus according to claim 3, wherein
  the switching metadata is generated on a basis of a similarity between a 3D object of a subject in each frame of the first 3D shape video and a 3D object of a subject in each frame of the second 3D shape video.

5. The video reproduction apparatus according to claim 4, wherein
  the switching processing unit is further configured to switch a frame to be reproduced, from a frame of the first 3D shape video to a frame of the second 3D shape video on a basis of the switching metadata.

6. The video reproduction apparatus according to claim 5, wherein,
  in a case where a frame of the first 3D shape video being reproduced is a frame not allowed by the switching metadata to be switched to a frame of the second 3D shape video,
  the switching processing unit is further configured to not perform switching from the first 3D shape video to the second 3D shape video up to a frame allowed by the switching metadata to be switched, even when the trigger information is acquired.

7. The video reproduction apparatus according to claim 6, wherein the switching metadata further includes a shiftable frame ID corresponding to a number of viewing experiences.

8. The video reproduction apparatus according to claim 7, wherein
  the acquisition unit is further configured to acquire line-of-sight information of a 3D object of a subject for each frame of the first 3D shape video and the second 3D shape video.

9. The video reproduction apparatus according to claim 8, wherein
  the line-of-sight information includes a position of a 3D object of a subject in a 3D shape video, a line-of-sight vector, and a line-of-sight availability flag of each frame of the first 3D shape video and the second 3D shape video.

10. The video reproduction apparatus according to claim 9, wherein
  the switching processing unit is further configured to switch a shiftable frame in accordance with the line-of-sight information and the number of viewing experiences.

11. The video reproduction apparatus according to claim 10, wherein
  the first 3D shape video is a video serving as a main of content and the second 3D shape video is a video of a specific sub scene of content.

12. The video reproduction apparatus according to claim 11, wherein
the switching processing unit is further configured to switch a background video of a viewing space in place of a 3D shape video of a subject in accordance with the switching metadata.

13. A reproduction method executed by a video reproduction apparatus, the reproduction method comprising:
acquiring a first 3D shape video generated from a plurality of viewpoint videos obtained by capturing images of a subject from different viewpoints, and a second 3D shape video being a video independent of the first 3D shape video; and
switching a frame to be reproduced, from a frame of the first 3D shape video to a frame of the second 3D shape video on a basis of a state of a viewer viewing the first 3D shape video,
wherein the frame to be reproduced is switched further based on a positional relationship between a viewpoint position of the viewer within a viewing space in the first 3D shape video that serves as the state of the viewer and a position of a 3D object of a subject within the viewing space in the first 3D shape video, and
wherein the position relationship includes whether or not the viewpoint position of the viewer within the viewing space in the first 3D shape video and the position of the 3D object of the subject corresponding to the frame of the first 3D shape video exists at a same position within the viewing space in the first 3D shape video at a same time.

14. A non-transitory computer-readable medium having embodied thereon a program, which when executed by a computer causes the computer to execute a reproduction method, the method comprising:
acquiring a first 3D shape video generated from a plurality of viewpoint videos obtained by capturing images of a subject from different viewpoints, and a second 3D shape video being a video independent of the first 3D shape video; and
switching a frame to be reproduced, from a frame of the first 3D shape video to a frame of the second 3D shape video on a basis of a state of a viewer viewing the first 3D shape video,
wherein the frame to be reproduced is switched further based on a positional relationship between a viewpoint position of the viewer within a viewing space in the first 3D shape video that serves as the state of the viewer and a position of a 3D object of a subject within the viewing space in the first 3D shape video, and
wherein the position relationship includes whether or not the viewpoint position of the viewer within the viewing space in the first 3D shape video and the position of the 3D object of the subject corresponding to the frame of the first 3D shape video exists at a same position within the viewing space in the first 3D shape video at a same time.

15. The video reproduction apparatus according to claim 1, wherein
a subject targeted by the second 3D shape video is a same subject as a subject targeted by the first 3D shape video, and the first 3D shape video and the second 3D shape video are videos representing different motions of the same subject.

16. A method of generating 3D shape video data, the method comprising:
processing of generating a first 3D shape video generated from a plurality of viewpoint videos obtained by capturing images of a subject from different viewpoints; and
processing of generating a second 3D shape video that is a 3D shape video generated from a plurality of viewpoint videos obtained by capturing images of a same subject as the first 3D shape video from different viewpoints, represents a different motion from the subject of the first 3D shape video, and is generated for switching a video on a basis of a state of a viewer viewing the first 3D shape video,
wherein the video is switched further based on a positional relationship between a viewpoint position of the viewer within a viewing space in the first 3D shape video that serves as the state of the viewer and a position of a 3D object of a subject within the viewing space in the first 3D shape video, and
wherein the position relationship includes whether or not the viewpoint position of the viewer within the viewing space in the first 3D shape video and the position of the 3D object of the subject corresponding to the frame of the first 3D shape video exists at a same position within the viewing space in the first 3D shape video at a same time.

17. The video reproduction apparatus according to claim 1, wherein the positional relationship is a distance between the viewpoint position of the viewer and the position of the 3D object of the subject.

18. The video reproduction apparatus according to claim 17, wherein the switching processing unit is further configured to switch the frame on a basis of the distance between the viewpoint position of the viewer and the position of the 3D object of the subject being equal to or less than a predetermined threshold value.

19. The video reproduction apparatus according to claim 1, wherein the switching processing unit switches the frame to be reproduced, from the frame of the first 3D shape video to the frame of the second 3D shape video, based on the positional relationship in which the viewpoint position of the viewer within the viewing space in the first 3D shape video and the position of the 3D object of the subject corresponding to the frame of the first 3D shape video existing at the same position within the same viewing space in the first 3D shape video at the same time.

* * * * *